United States Patent

Kojima et al.

[11] Patent Number: 5,086,356
[45] Date of Patent: Feb. 4, 1992

[54] COMPACT ZOOM LENS SYSTEM

[75] Inventors: Ayako Kojima; Hisayuki Masumoto, both of Osaka, Japan

[73] Assignee: Minolta Camera Kabushiki Kaisha, Osaka, Japan

[21] Appl. No.: 593,476

[22] Filed: Oct. 1, 1990

Related U.S. Application Data

[63] Continuation of Ser. No. 456,073, Dec. 21, 1989, abandoned, which is a continuation of Ser. No. 294,276, Jan. 6, 1989, abandoned.

[30] Foreign Application Priority Data

| Jan. 1, 1988 [JP] | Japan | 63-3316 |
| Jan. 8, 1988 [JP] | Japan | 63-1937 |
| Mar. 31, 1988 [JP] | Japan | 63-80147 |

[51] Int. Cl.⁵ .................... G02B 15/14; G02B 13/18
[52] U.S. Cl. ............................. 359/686; 359/708
[58] Field of Search ............... 350/423, 427, 432–435

[56] References Cited

U.S. PATENT DOCUMENTS

| 4,494,828 | 1/1985 | Masumoto et al. | 350/427 |
| 4,629,294 | 12/1986 | Tanaka et al. | 350/427 |
| 4,673,258 | 6/1987 | Masumoto | 350/427 |
| 4,701,033 | 10/1987 | Masumoto | 350/423 X |
| 4,702,567 | 10/1987 | Kato | 350/427 |
| 4,773,744 | 9/1988 | Yamanashi | 350/427 |
| 4,787,719 | 11/1988 | Imai | 350/427 |
| 4,789,226 | 12/1988 | Ogata | 350/427 |
| 4,789,229 | 12/1988 | Yamanashi | 350/427 |
| 4,822,152 | 4/1989 | Yamanashi | 350/432 X |
| 4,844,600 | 7/1989 | Tokumaru | 350/427 |
| 4,854,682 | 8/1989 | Yamanashi | 350/432 X |

Primary Examiner—Scott J. Sugarman
Attorney, Agent, or Firm—Price, Gess & Ubell

[57] ABSTRACT

A compact zoom lens system having from the object side to the image side a first lens unit of positive refractive power, a second lens unit of negative refractive power with a first variable air space formed between the first and second lens units, a third lens unit of positive refractive power and a fourth lens unit of negative refractive power with a second variable air space formed between the third lens unit and the fourth lens unit. The first lens unit, the fourth lens unit and at least one of the second and third lens units are shiftable from the image side to the object side so that the first variable air space increases and the second variable air space decreases in the zooming operation from the shortest focal length to the longest focal length. The third lens unit and/or the fourth lens unit can have an aspherical surface.

28 Claims, 26 Drawing Sheets

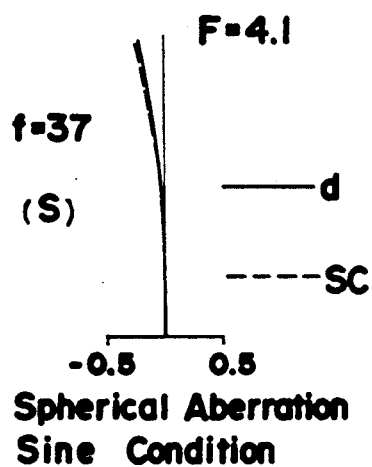
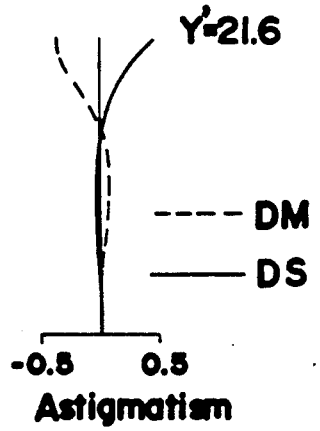
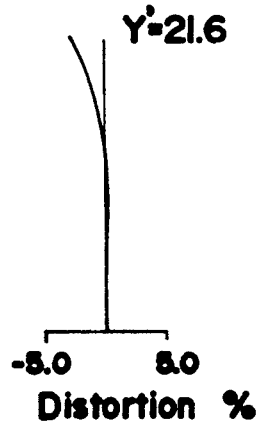
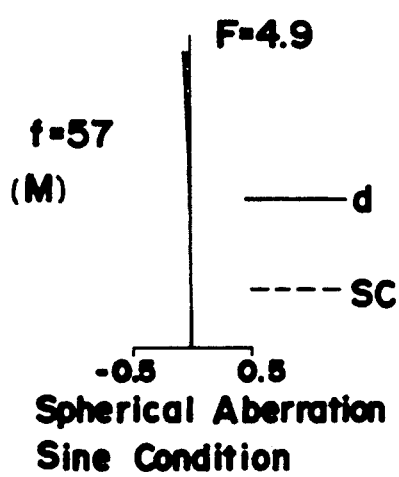
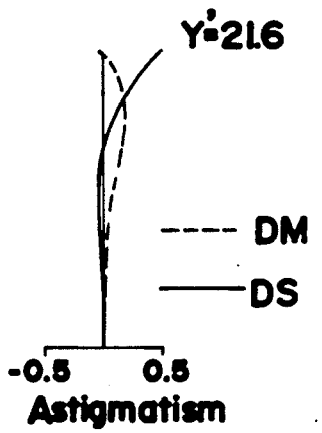
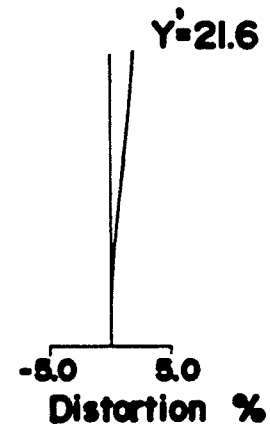
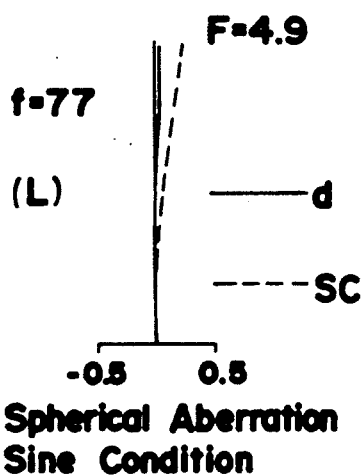
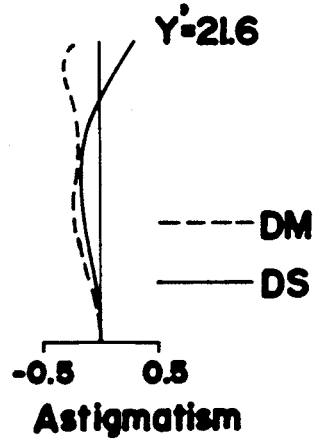
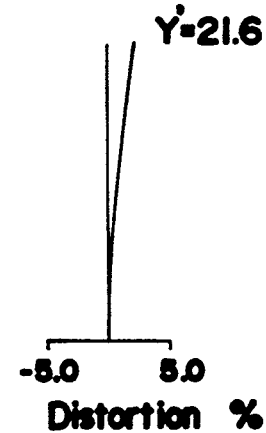

F=4.1
f=37
(S)
—— d
---- SC
-0.5  0.5
Spherical Aberration
Sine Condition

Y=21.6
---- DM
—— DS
-0.5  0.5
Astigmatism

Y=21.6
-5.0  5.0
Distortion %

F=4.9
f=57
(M)
—— d
---- SC
-0.5  0.5
Spherical Aberration
Sine Condition

Y=21.6
---- DM
—— DS
-0.5  0.5
Astigmatism

Y=21.6
-5.0  5.0
Distortion %

F=5.1
f=77
(L)
—— d
---- SC
-0.5  0.5
Spherical Aberration
Sine Condition

Y=21.6
---- DM
—— DS
-0.5  0.5
Astigmatism

Y=21.6
-5.0  5.0
Distortion %

Spherical Aberration
Sine Condition

Astigmatism

Distortion %

Spherical Aberration
Sine Condition

Astigmatism

Distortion %

Spherical Aberration
Sine Condition

Astigmatism

Distortion %

Spherical Aberration
Sine Condition

Astigmatism

Distortion %

Spherical Aberration
Sine Condition

Astigmatism

Distortion %

Spherical Aberration
Sine Condition

Astigmatism

Distortion %

F=4.1, f=37 (S)
Spherical Aberration Sine Condition
—— d
---- SC

Y'=21.6
Astigmatism
---- DM
—— DS

Y'=21.6
Distortion %

F=4.9, f=57 (M)
Spherical Aberration Sine Condition
—— d
---- SC

Y'=21.6
Astigmatism
---- DM
—— DS

Y'=21.6
Distortion %

F=5.1, f=77 (L)
Spherical Aberration Sine Condition
—— d
---- SC

Y'=21.6
Astigmatism
---- DM
—— DS

Y'=21.6
Distortion %

Spherical Aberration
Sine Condition

Astigmatism

Distortion %

Spherical Aberration
Sine Condition

Astigmatism

Distortion %

Spherical Aberration
Sine Condition

Astigmatism

Distortion %

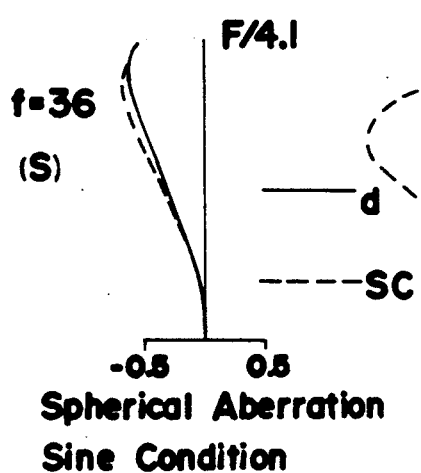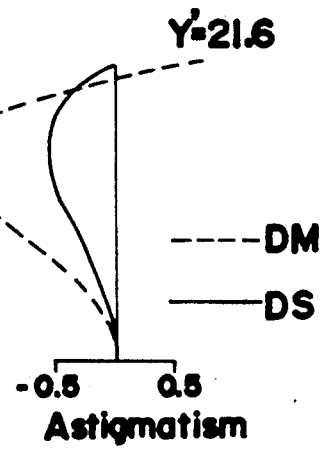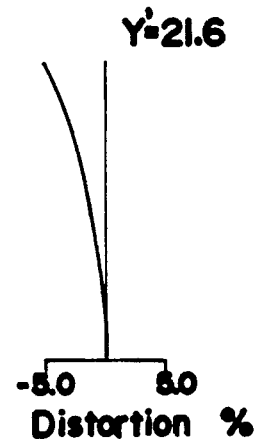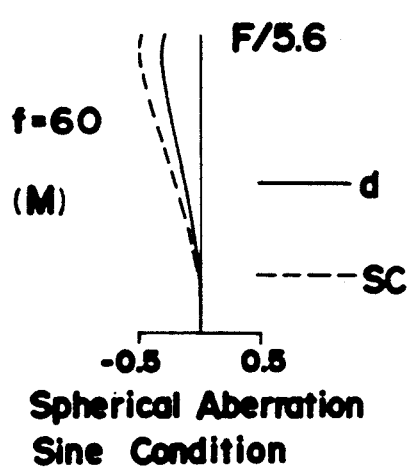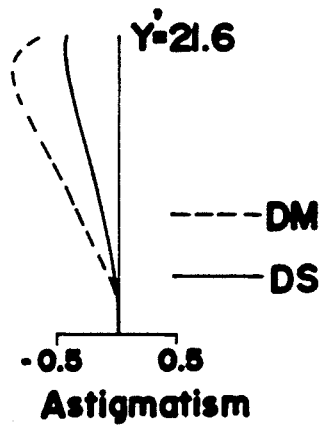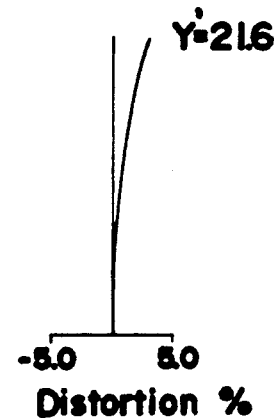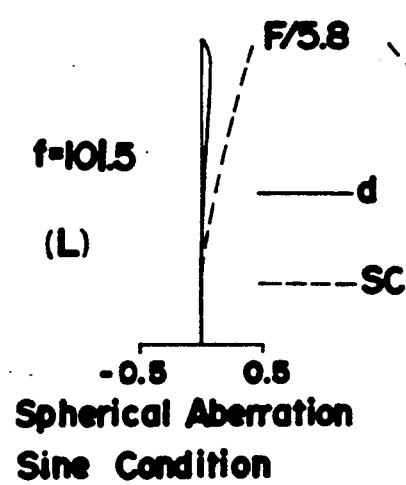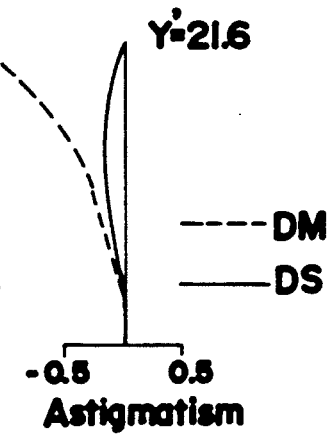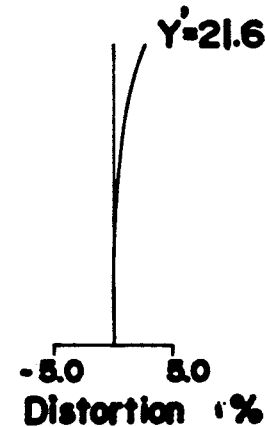

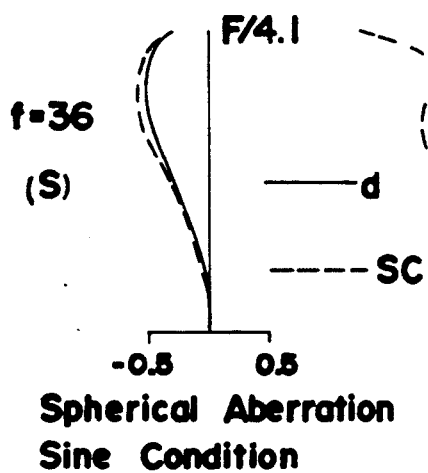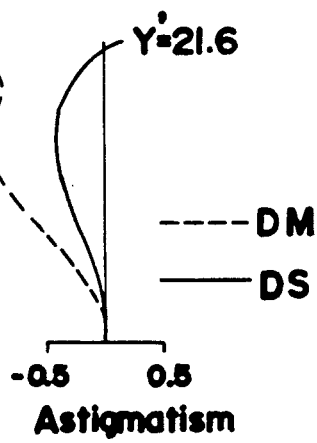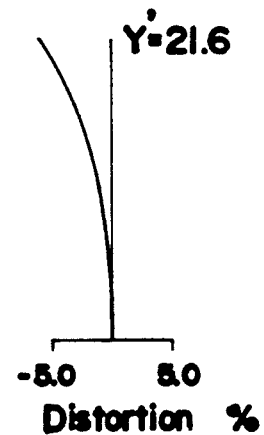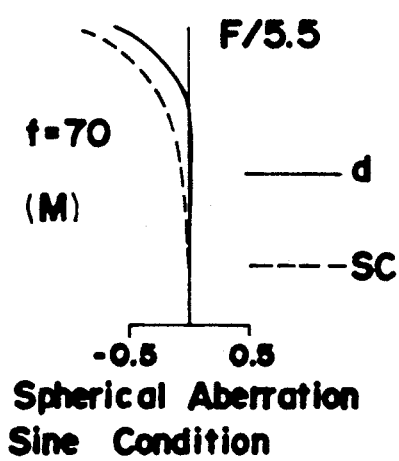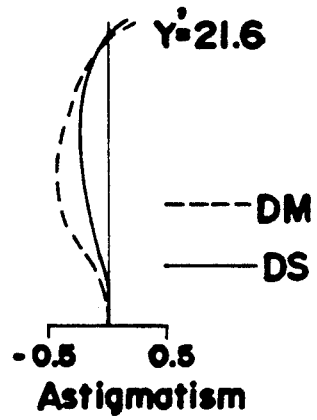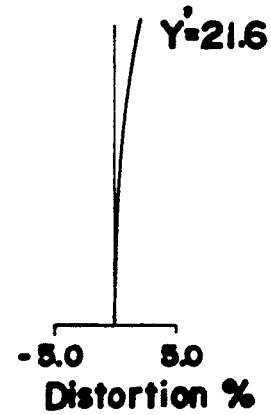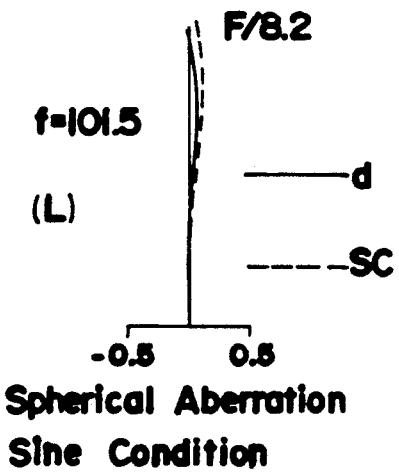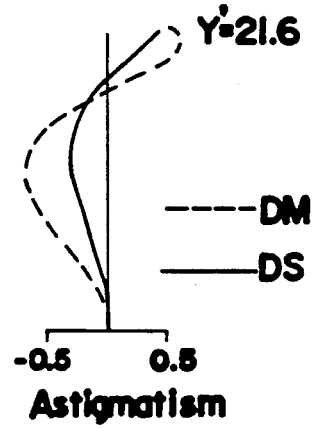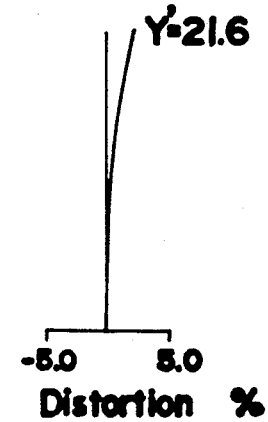

f=36
(S)

f=70
(M)

f=101.5
(L)

FIG.50a / FIG.50b / FIG.50c
f=36 (S), F/4.1, Y'=21.6, Y'=21.6
—— d, ---- SC, ---- DM, —— DS
Spherical Aberration Sine Condition / Astigmatism / Distortion %

FIG.51a / FIG.51b / FIG.51c
f=60 (M), F/5.6, Y'=21.6, Y'=21.6
—— d, ---- SC, ---- DM, —— DS
Spherical Aberration Sine Condition / Astigmatism / Distortion %

FIG.52a / FIG.52b / FIG.52c
f=101.5 (L), F/5.8, Y'=21.6, Y'=21.6
—— d, ---- SC, ---- DM, —— DS
Spherical Aberration Sine Condition / Astigmatism / Distortion %

COMPACT ZOOM LENS SYSTEM

This is a continuation of application Ser. No. 456,073, filed on Dec. 21, 1989, which is a continuation of U.S. Ser. No. 294,276, filed on Jan. 6, 1989 (both abandoned).

BACKGROUND OF THE INVENTION

1. Field of the Invention

This invention relates to a compact zoom lens system in which the lower limit of the back focal length is not restricted, such as a compact zoom lens system used for 35 mm lens-shutter type camera.

2. Description of the Relating Art

Conventionally, there is known a two components type compact zoom lens system which comprises from the object side to the image side, a first lens group of a negative refractive power and a second lens group of a positive refractive power. On the other hand, in order to increase the zoom ratio, for example, by U.S. Pat. No. 4,673,258, there are provided various types of zoom lens systems in which a lens group of a positive refractive power is located at the objective side end of the whole lens systems, and in which a plurality of lens groups are shifted in the zooming operation. Almost all types of such zoom lens systems, however, are designed for a single lens reflex camera which requires sufficient room for the reflex mirror to swing therein. Thus, since the lower limit of the back focal length is restricted the total length of such zoom lens system, i.e., the distance from the object side surface of the lens element located at the object side end to the image plane, is relatively long.

Contrarily, as a compact zoom lens system in which the lower limit of the back focal length is not restricted, there are shown a type of lens system which includes, from the object side to the image side, a first lens group of a positive refractive power and a second lens group of a negative refractive power. This type is disclosed in Japanese Laid-Open Patent Application No. Sho 56-128911, and Sho 57-201213. In this type, however, since the shifting amount of the lens group shifted in the zooming operation is relatively long, the lens barrel of such a zoom lens system becomes big. Furthermore, in this type, since an aperture stop is shifted along the optical axis in the zooming operation, the construction of the lens barrel becomes complicated. Especially, if this type of zoom lens system is used for a 35 mm lens-shutter camera, such a camera becomes big and complicated because it requires to locate a plurality of shutter blades and its driving unit near the aperture stop.

To solve these problems, U.S. Pat. No. 4,701,033, by the applicant for the present invention, proposes a four components type zoom lens system comprising, from the object side to the image side, a first lens unit of a positive refractive power, a second lens unit of a negative refractive power, a third lens unit of a positive refractive power, and a fourth lens unit of a negative refractive power. In this type, however, the zoom ratio of the whole lens system is small, i.e., 1.6X or thereabouts, so it is desired to magnify the zoom ratio.

SUMMARY OF THE INVENTION

The object of the present invention is to provide a compact zoom lens system of a novel type which has a high optical performance and which is suitable for a camera having no lower limit of the back focal length of the lens system.

The other object of the present invention is to provide a compact zoom lens system which is ultra compact in comparison with the conventional zoom lens system while maintaining high optical performance.

The further object of the present invention is to provide a compact zoom lens system which has a zoom ratio higher than that of the zoom lens system which is disclosed in U.S. Pat. No. 4,701,033.

According to the present invention, a compact zoom lens system comprises, from the object side to the image side, a first lens unit of a positive refractive power, a second lens unit of a negative refractive power with a first variable air space formed between the first and second lens units, a third lens unit of a positive refractive power, and a fourth lens unit of a negative refractive power with a second variable air space formed between the third lens unit and fourth lens unit, wherein the back focal length of the whole lens system for the shortest focal length is less than half of the diagonal length of the image plane, wherein the first lens unit, the fourth lens unit and at least one of the second and third lens units are shiftable from the image side to the object side so that the first variable air space increases and the second variable air space decreases in the zooming operation from the shortest focal length to the longest focal length.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 17a, 17b and 17c represent the aberration curves of the embodiment 2 for the shortest focal length;

FIG. 18a, 18b and 18c represent the aberration curves of the embodiment 2 for the middle focal length;

FIG. 19a, 19b and 19c represent the aberration curves of the embodiment 2 for the longest focal length;

FIG. 34a, 34b and 14c represent the aberration curves of the embodiment 7 for the longest focal length;

FIG. 35a, 35b and 35c represent the aberration curves of the embodiment 8 for the shortest focal length;

FIG. 36a, 36b and 36c represent the aberration curves of the embodiment 8 for the middle focal length;

FIG. 37a, 37b and 37c represent the aberration curves of the embodiment 8 for the longest focal length;

FIG. 41a, 41b and 41c represent the aberration curves of the embodiment 10 for the shortest focal length;

FIG. 42a, 42b and 42c represent the aberration curves of the embodiment 10 for the middle focal length;

FIG. 43a, 43b and 43c represent the aberration curves of the embodiment 10 for the longest focal length;

FIG. 50a, 50b and 50c represent the aberration curves of the embodiment 13 for the shortest focal length;

FIG. 51a, 51b and 51c represent the aberration curves of the embodiment 13 for the middle focal length; and FIG. 52a, 52b and 52c represent the aberration curves of the embodiment 13 for the longest focal length.

DETAILED DESCRIPTION OF THE PREFERRED EMBODIMENTS

Figure 1:
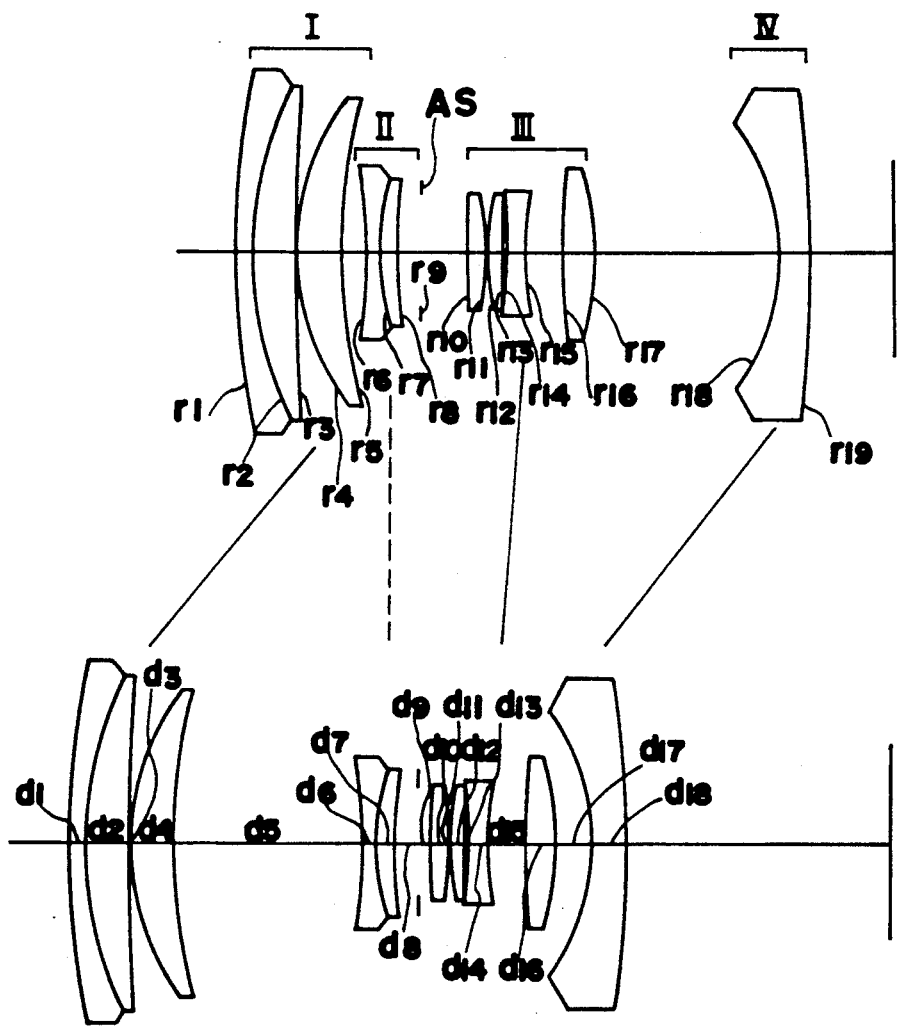
FIG. 1 represents cross sectional view of the lens system according to the embodiment 1 of the present invention.

The following description is provided to enable any person skilled in the optical and camera field to make and use the invention and sets forth the best modes contemplated by the inventors for carrying out their invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm lens-shutter camera.

In the drawings, schematic cross sectional views disclose the position of the lens system and lens elements for the shortest focal length and the longest focal length with lines therebetween representing the manner of their movements for zooming. Due to the number of lens elements involved, it was not deemed appropriate to include individual designation of the radii of curvature and axial distances for each lens element and air spaces. These values, however, are provided in the accompanying tables set forth herein, and the schematic cross sectional views of the respective embodiments follow the normal conventions of an object at the left-hand side of the drawing and the image plane at the right-hand side.

Figure 2:
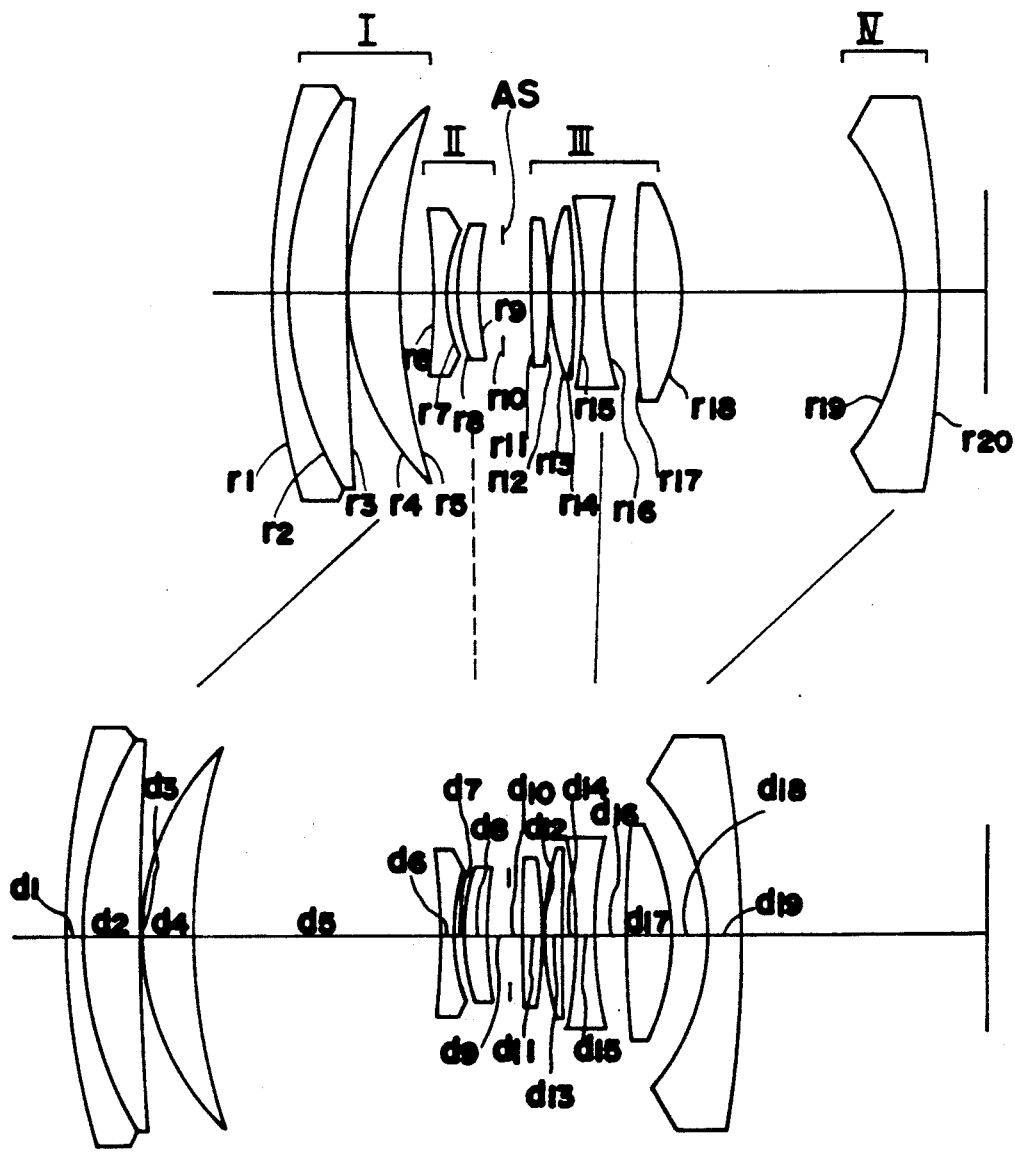
FIG. 2 represents cross sectional view of the lens system according to the embodiment 2 of the present invention.
Figure 3:
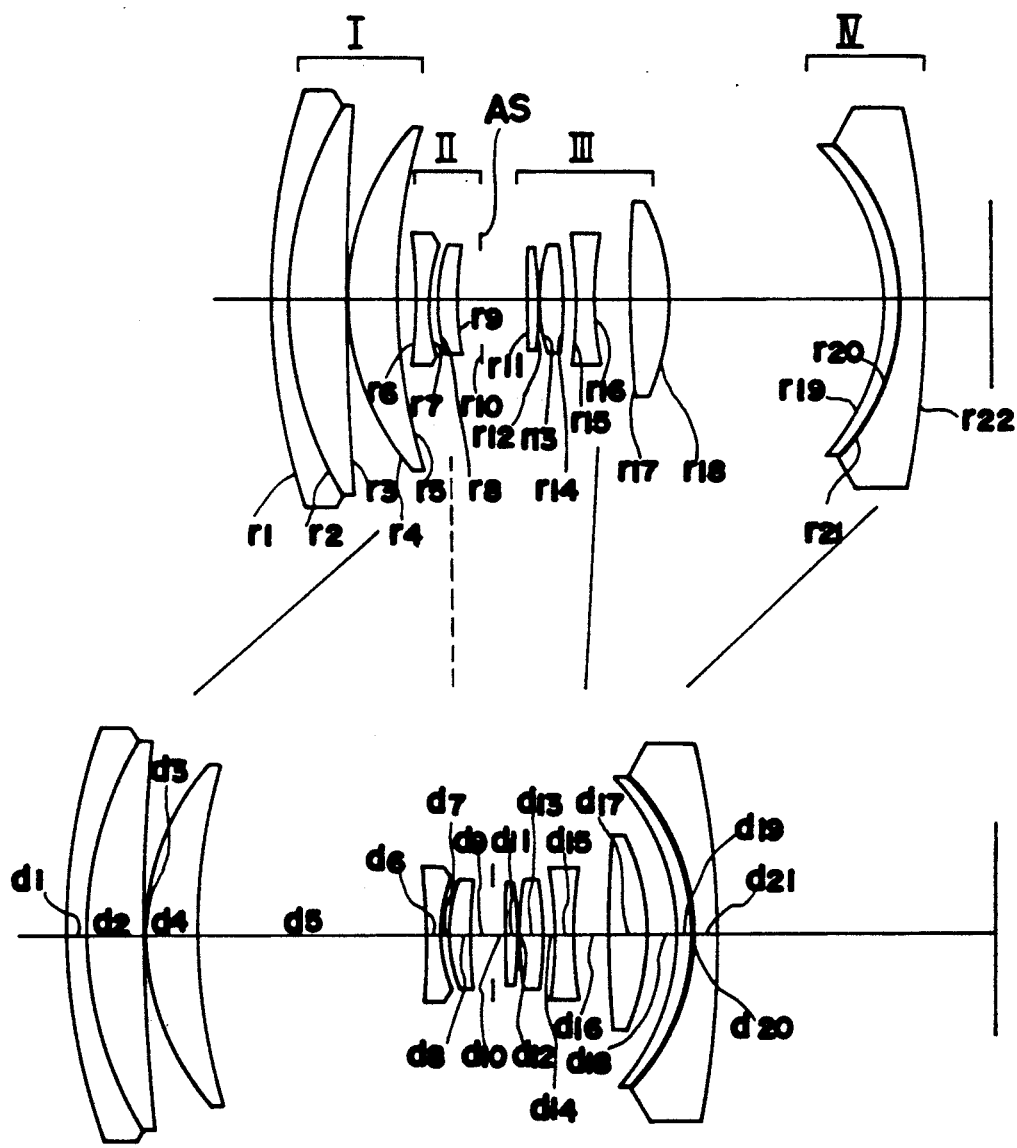
FIG. 3 represents cross sectional view of the lens system according to the embodiment 3 of the present invention.
Figure 4:
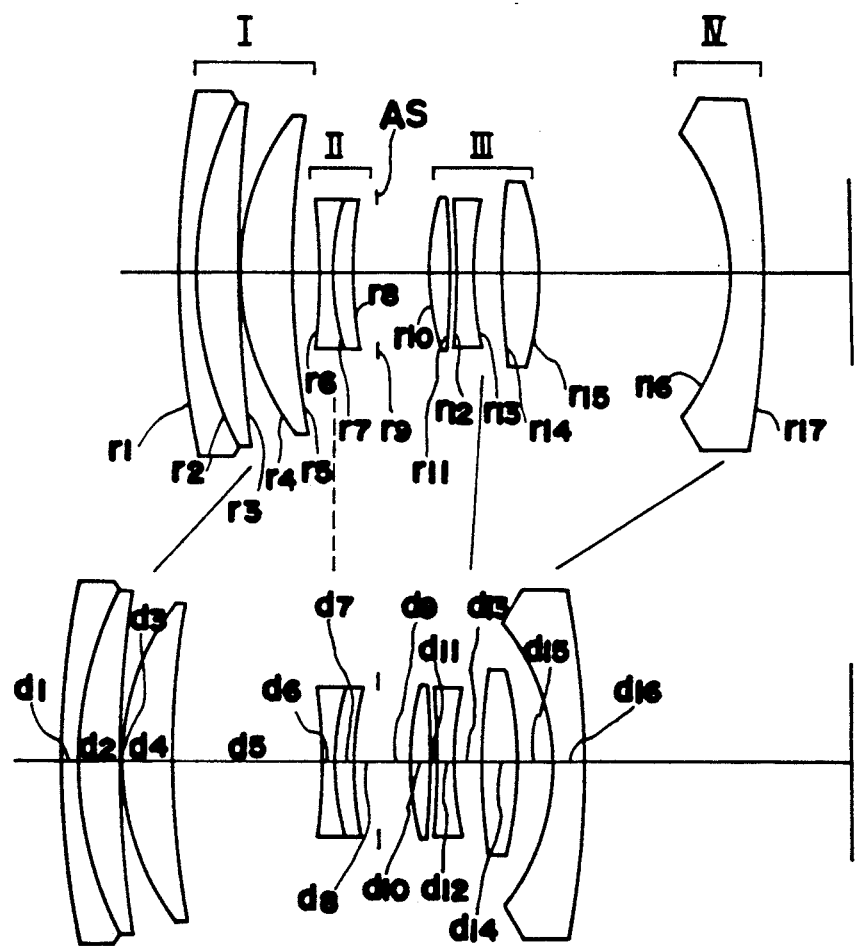
FIG. 4 represents cross sectional view of the lens system according to the embodiment 4 of the present invention.
Figure 5:
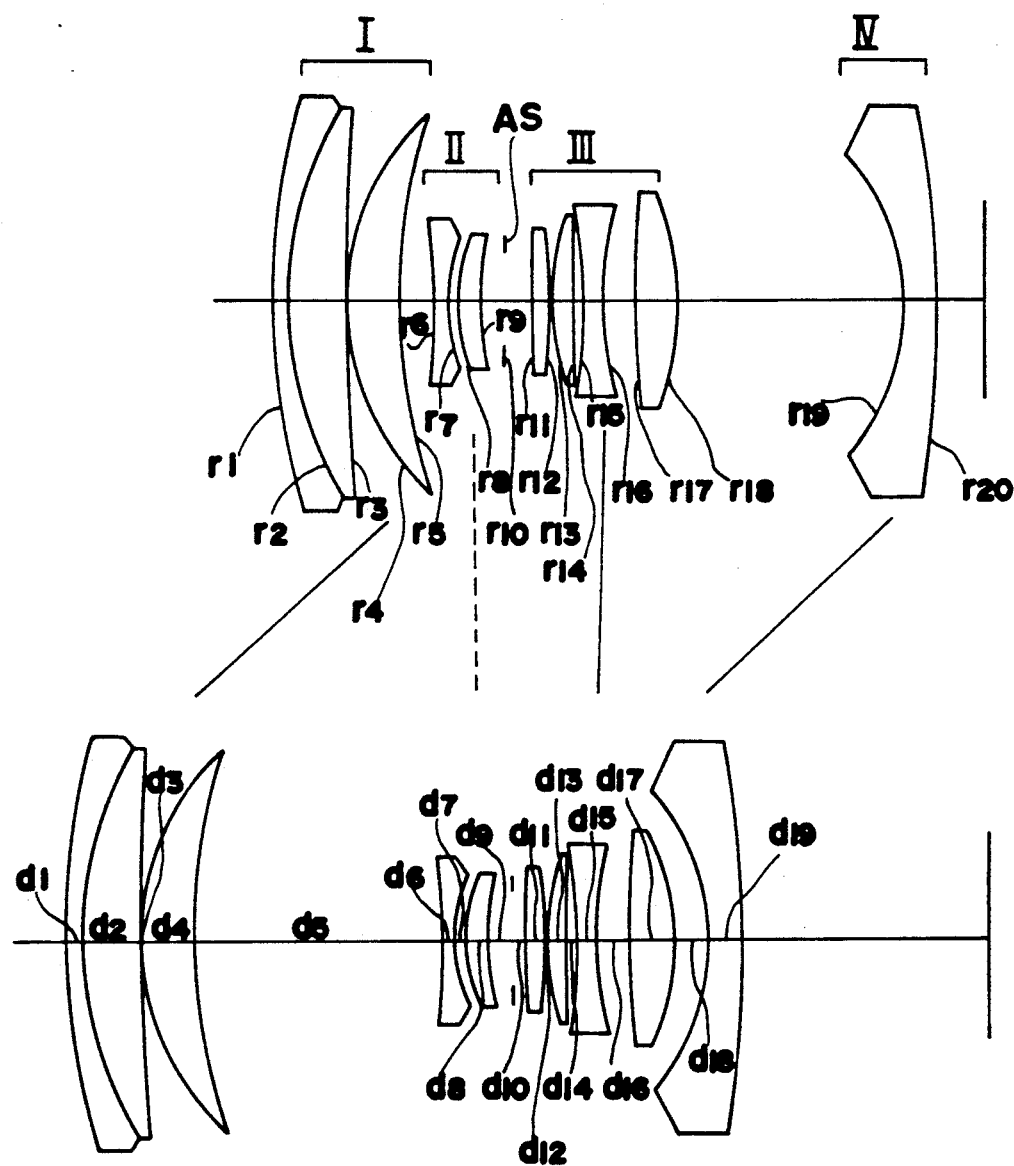
FIG. 5 represents cross sectional view of the lens system according to the embodiment 5 of the present invention.
Figure 6:
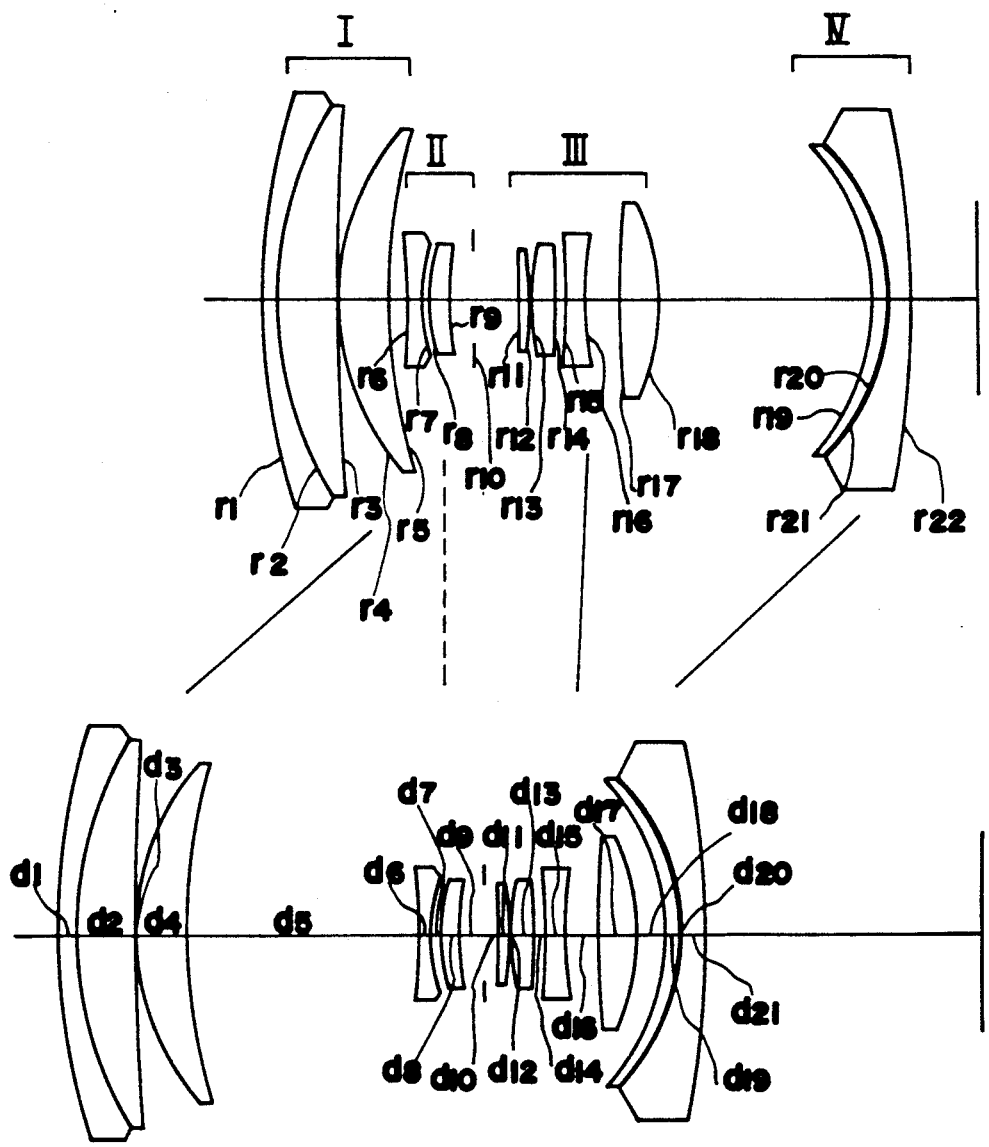
FIG. 6 represents cross sectional view of the lens system according to the embodiment 6 of the present invention.
Figure 7:
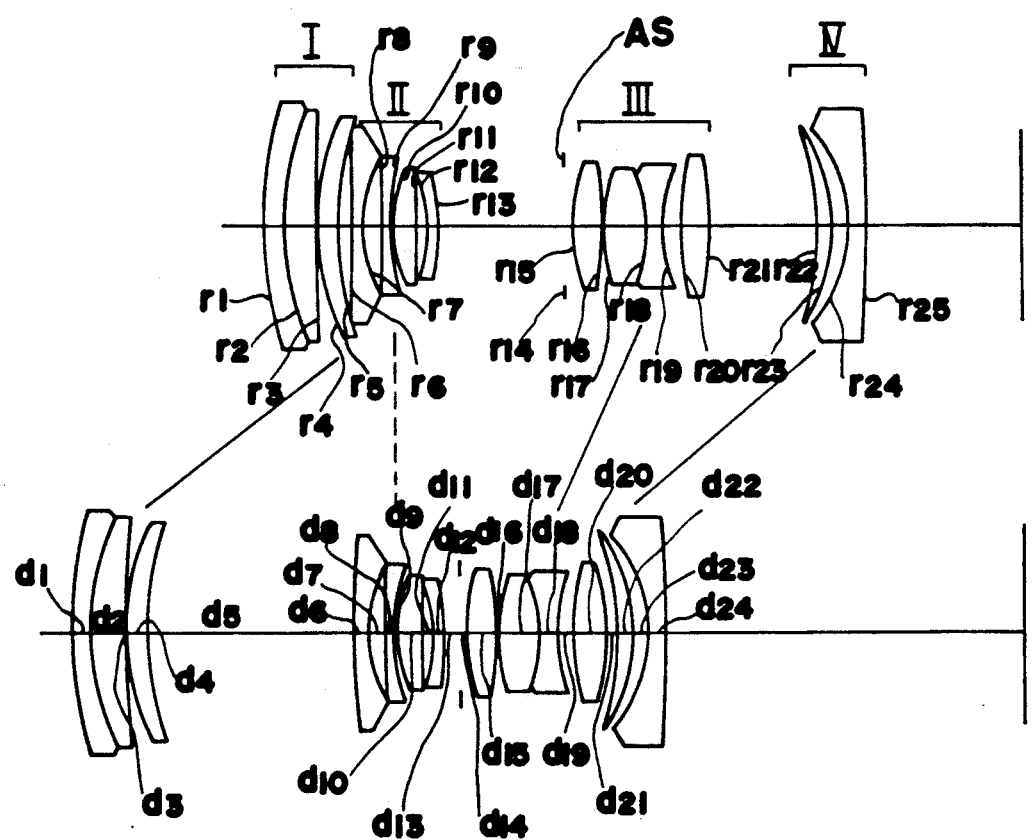
FIG. 7 represents cross sectional view of the lens system according to the embodiment 7 of the present invention.
Figure 8:
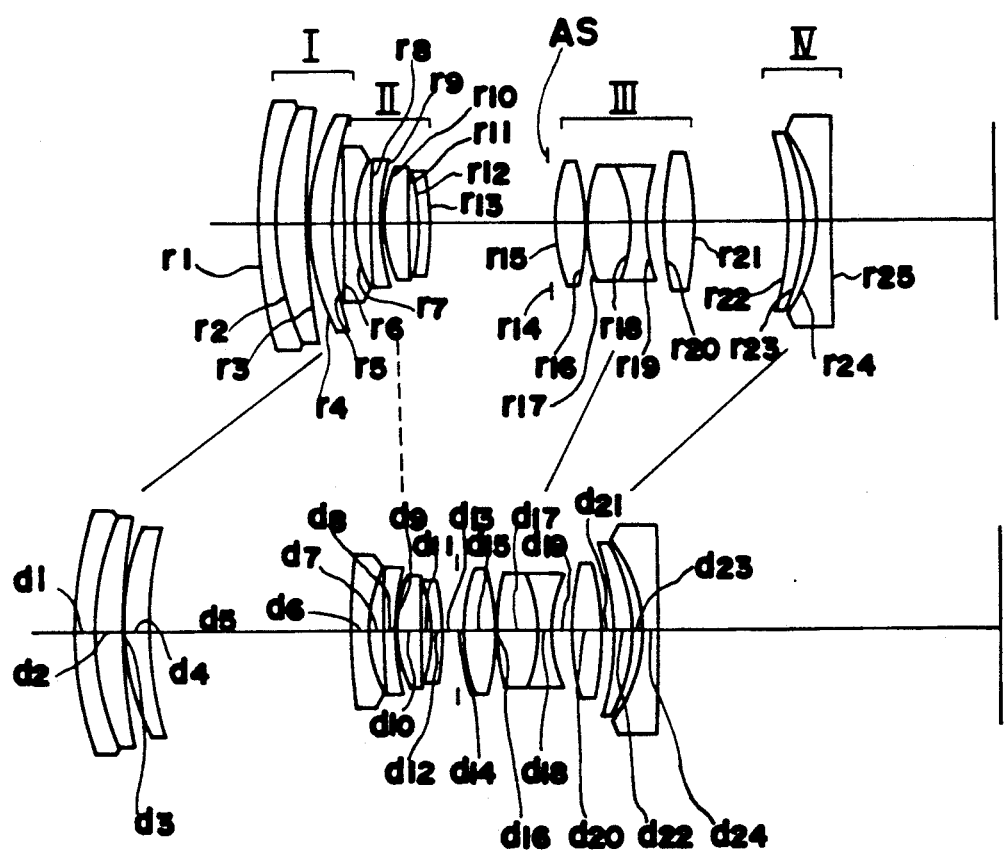
FIG. 8 represents cross sectional view of the lens system according to the embodiment 8 of the present invention.
Figure 9:
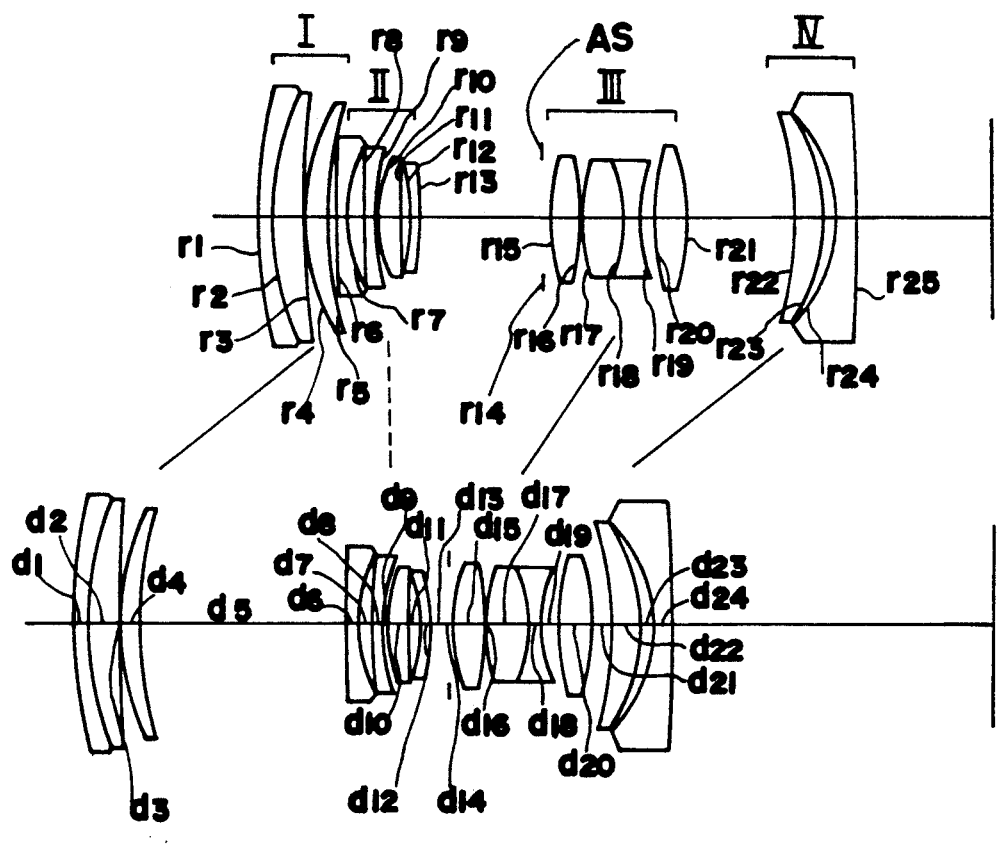
FIG. 9 represents cross sectional view of the lens system according to the embodiment 9 of the present invention.
Figure 10:
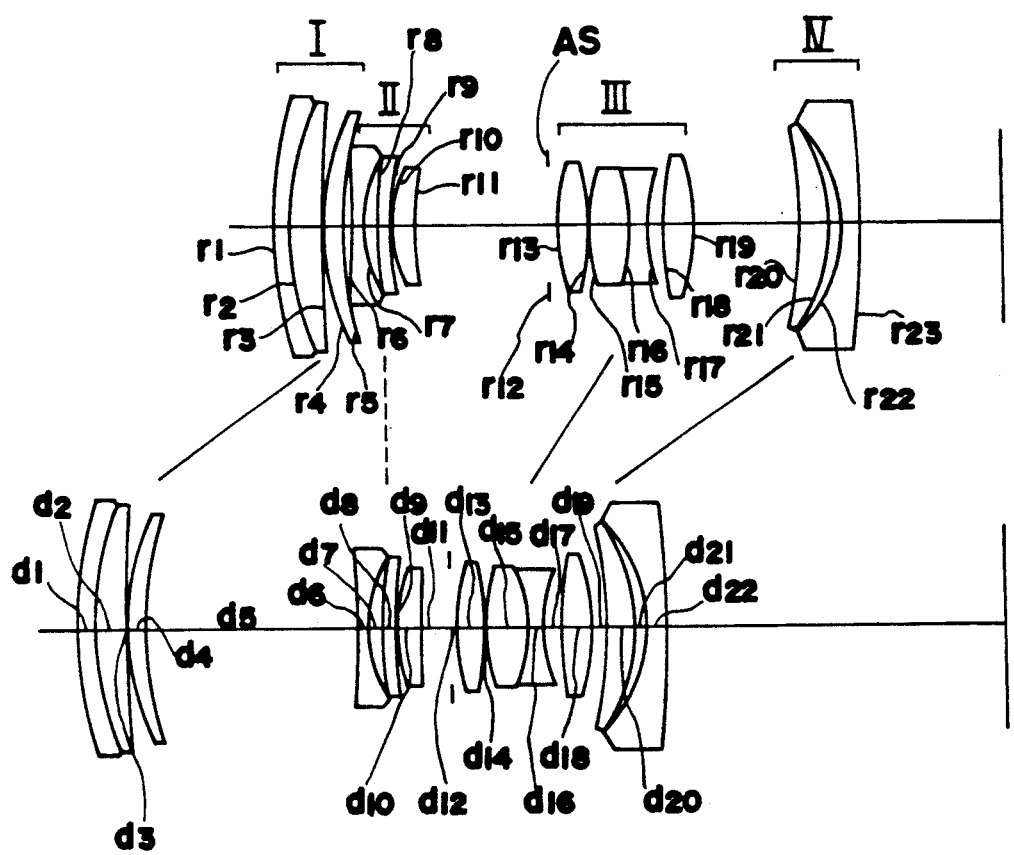
FIG. 10 represents cross sectional view of the lens system according to the embodiment 10 of the present invention.
Figure 11:
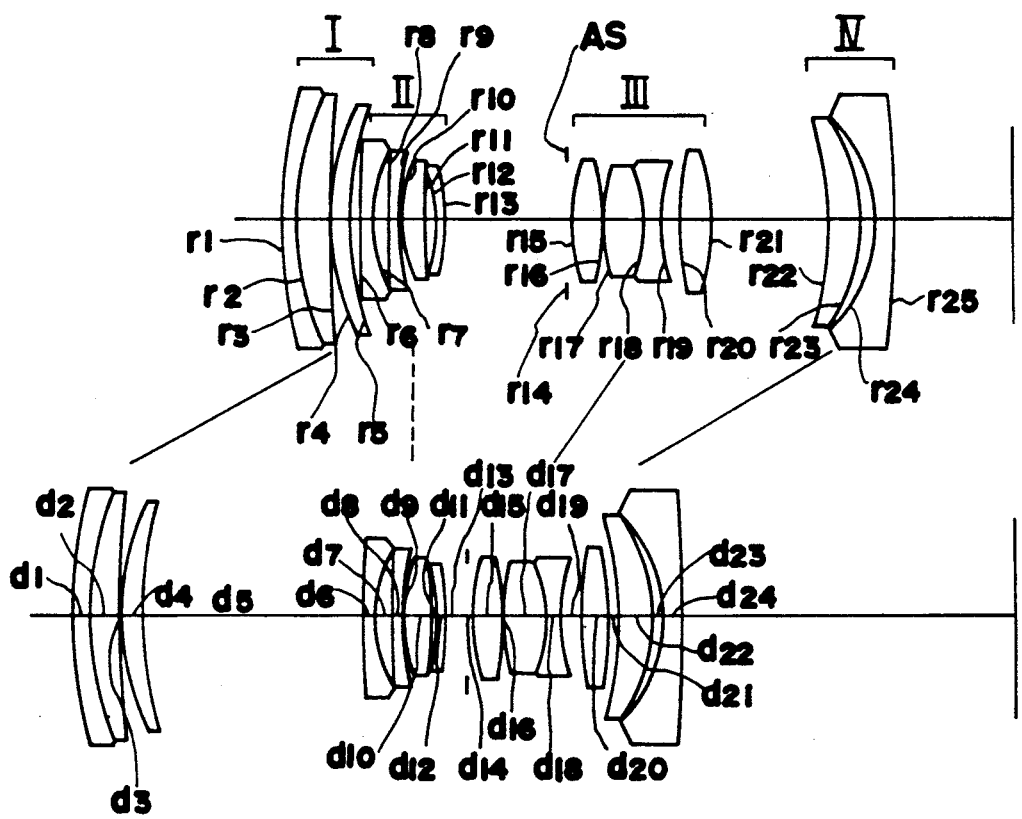
FIG. 11 represents cross sectional view of the lens system according to the embodiment 11 of the present invention.
Figure 12:
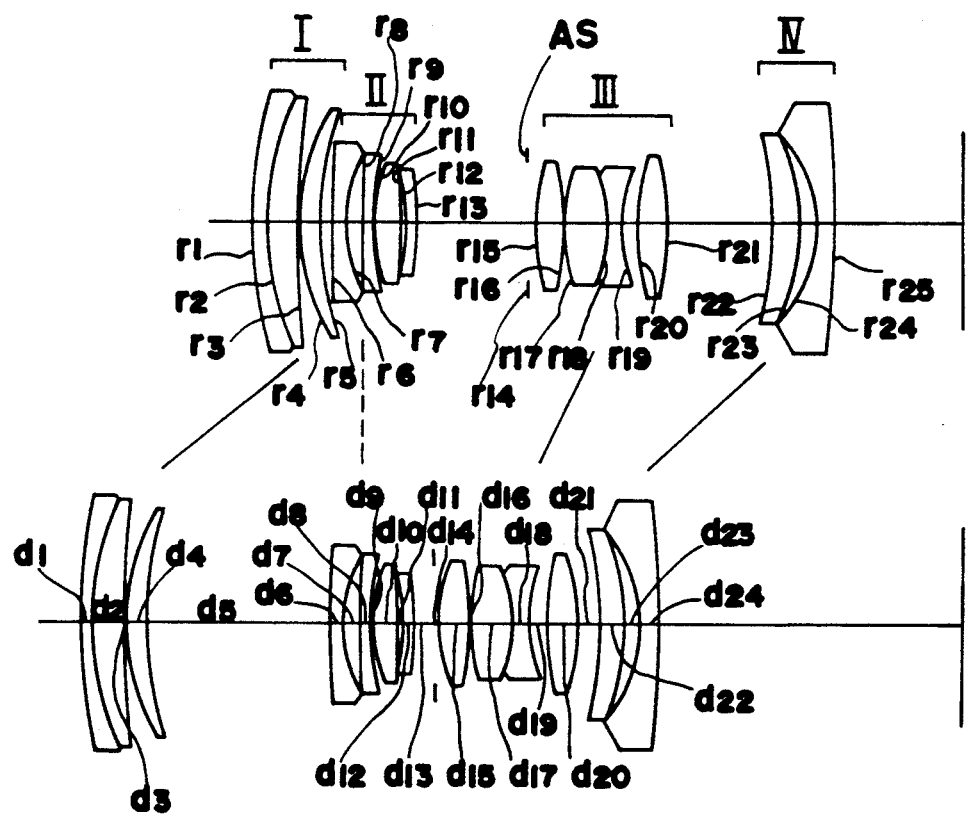
FIG. 12 represents cross sectional view of the lens system according to the embodiment 12 of the present invention.
Figure 13:
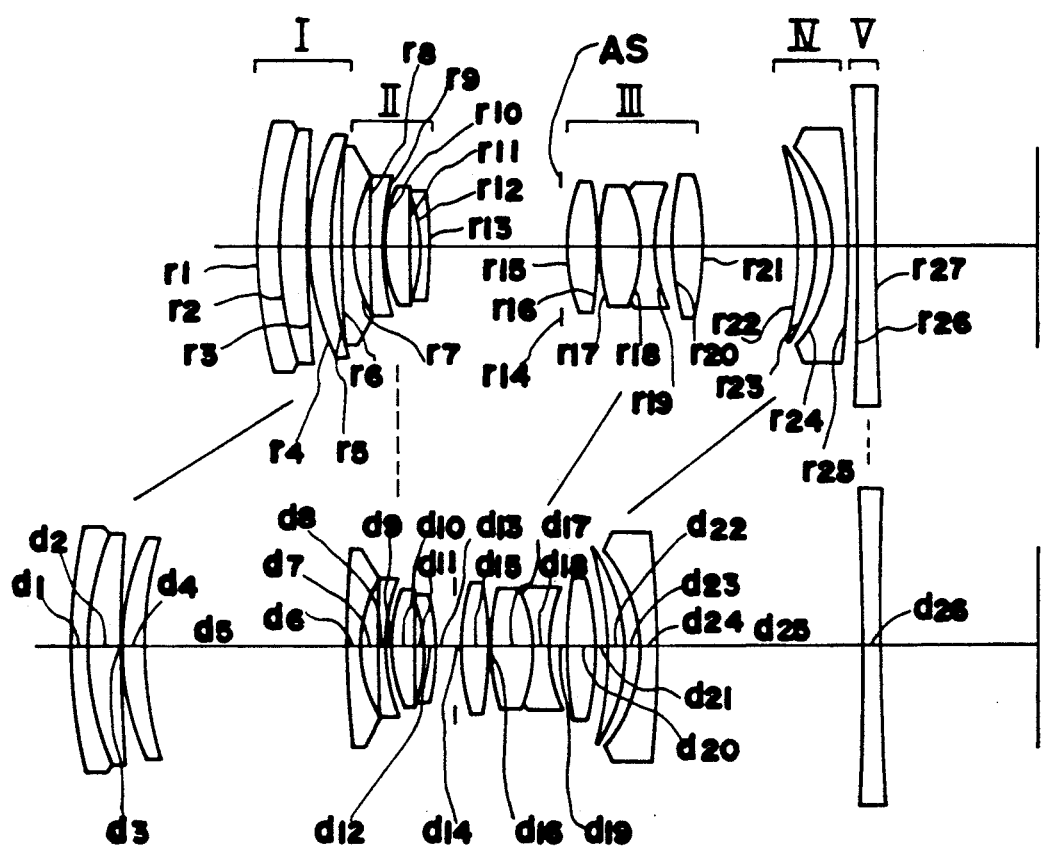
FIG. 13 represents cross sectional view of the lens system according to the embodiment 13 of the present invention.
Figure 14A:
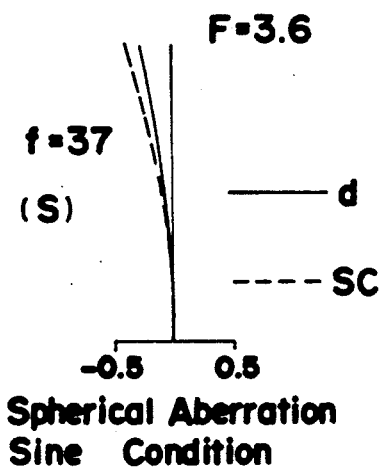
FIG. 14a, 14b and 14c represent the aberration curves of the embodiment 1 for the shortest focal length.
Figure 14B:
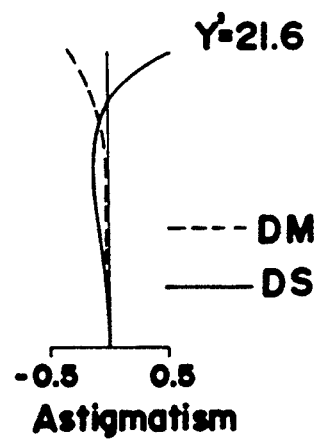
Figure 14C:
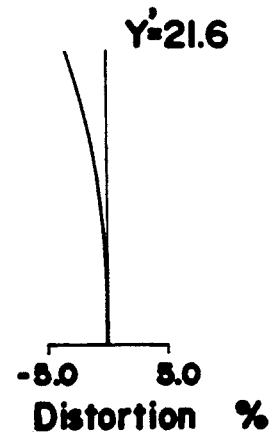
Figure 15A:
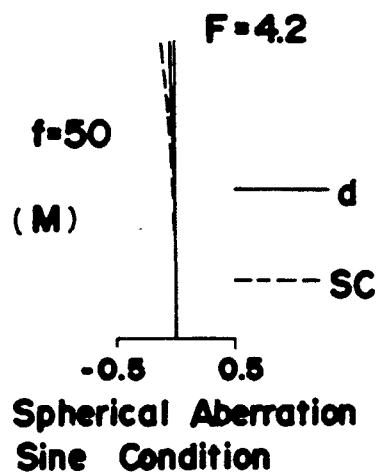
FIG. 15a, 15b and 15c represent the aberration curves of the embodiment 1 for the middle focal length.
Figure 15B:
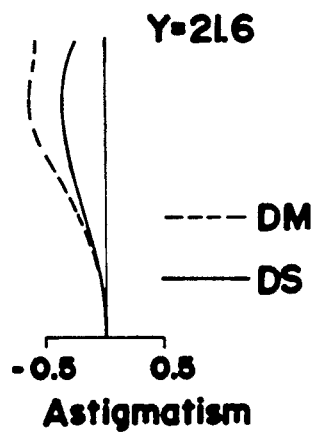
Figure 15C:
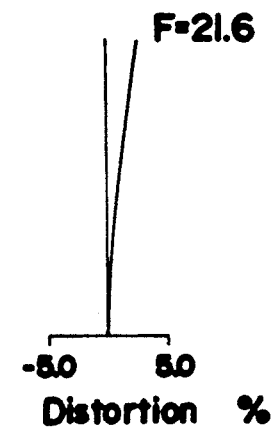
Figure 16A:
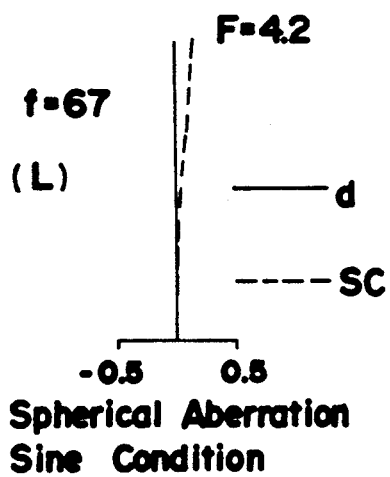
FIG. 16a, 16b and 16c represent the aberration curves of the embodiment 1 for the longest focal length.
Figure 16B:
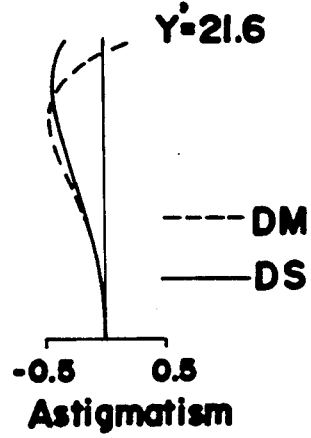
Figure 16C:
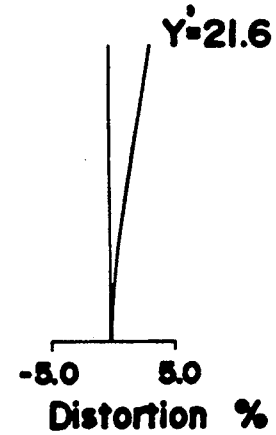
Figure 20A:
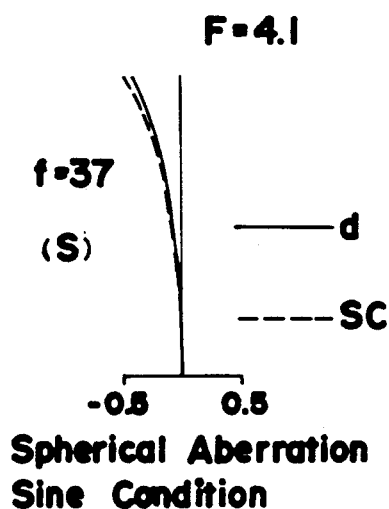
FIG. 20a, 20b and 20c represent the aberration curves of the embodiment 3 for the shortest focal length.
Figure 20B:
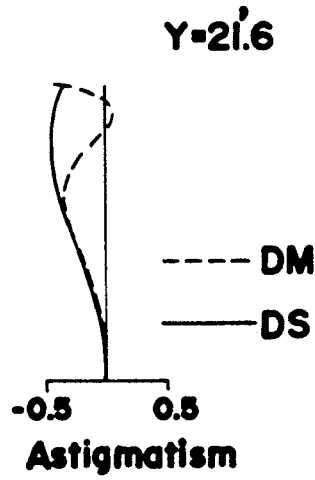
Figure 20C:
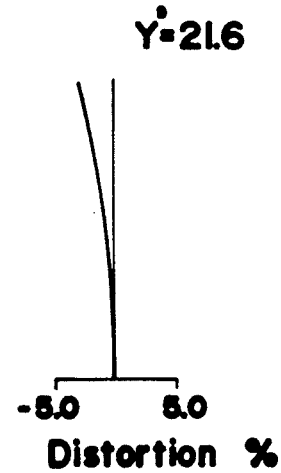
Figure 21A:
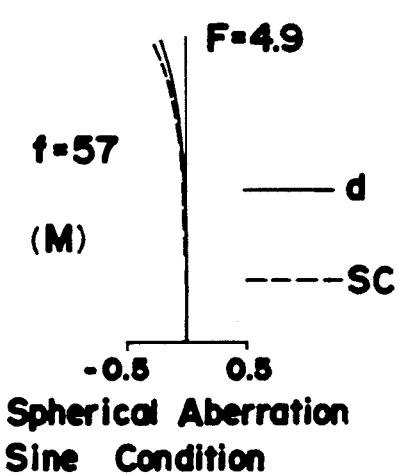
FIG. 21a, 21b and 21c represent the aberration curves of the embodiment 3 for the middle focal length.
Figure 21B:
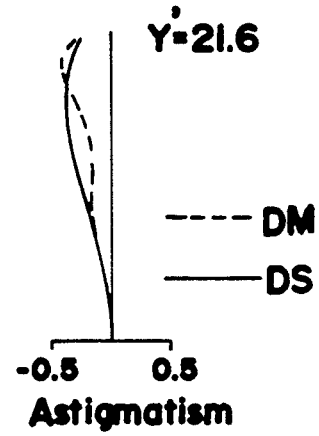
Figure 21C:
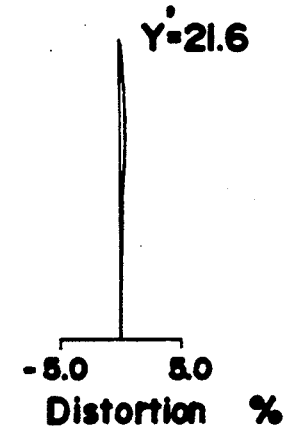
Figure 22A:
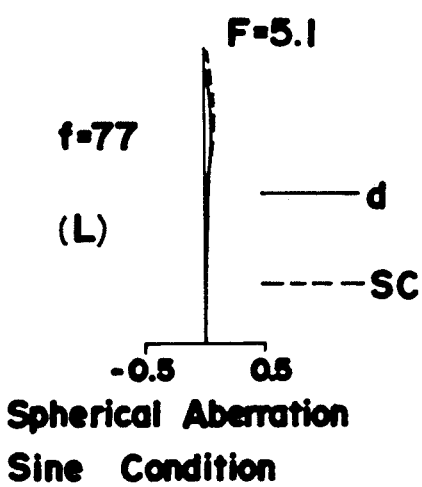
FIG. 22a, 22b and 22c represent the aberration curves of the embodiment 3 for the longest focal length.
Figure 22B:
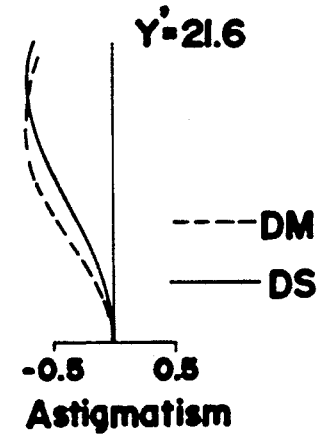
Figure 22C:
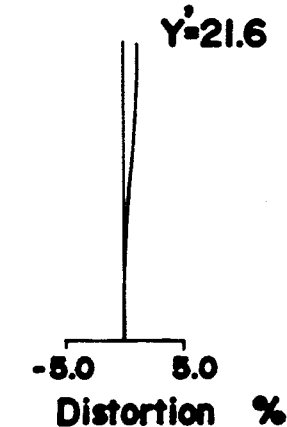
Figure 23A:
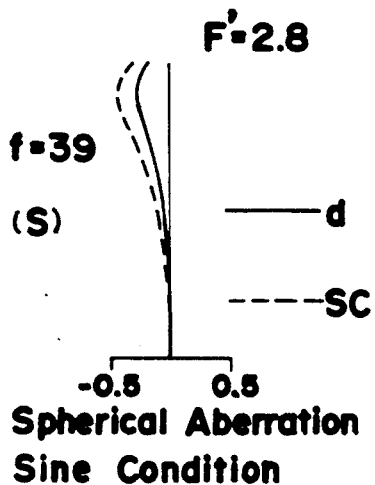
FIG. 23a, 23b and 23c represent the aberration curves of the embodiment 4 for the shortest focal length.
Figure 23B:
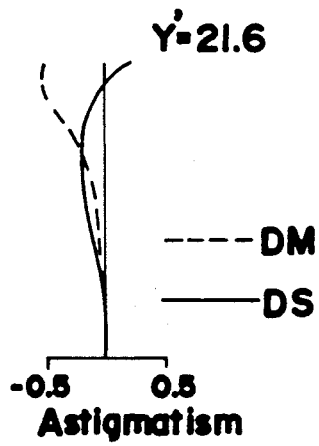
Figure 23C:
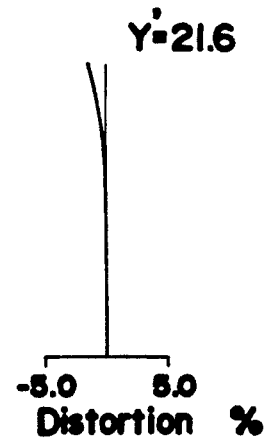
Figure 24A:
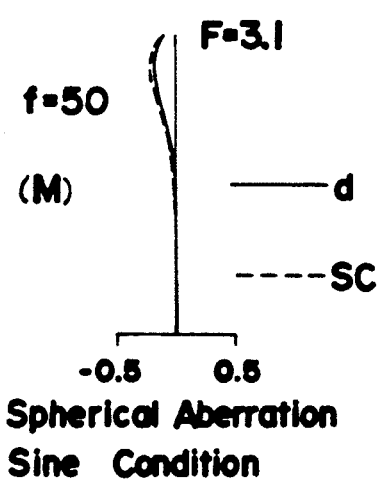
FIG. 24a, 24b and 24c represent the aberration curves of the embodiment 4 for the middle focal length.
Figure 24B:
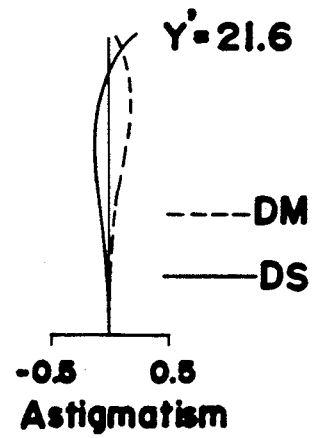
Figure 24C:
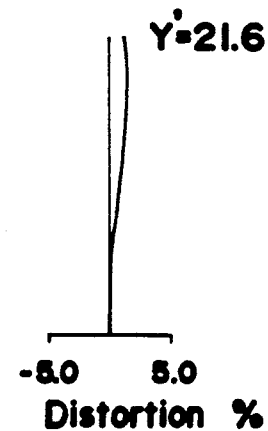
Figure 25A:
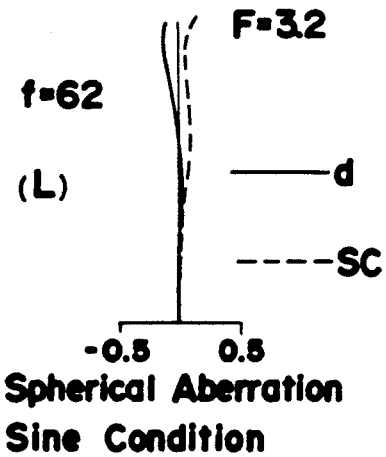
FIG. 25a, 25b and 25c represent the aberration curves of the embodiment 4 for the longest focal length.
Figure 25B:
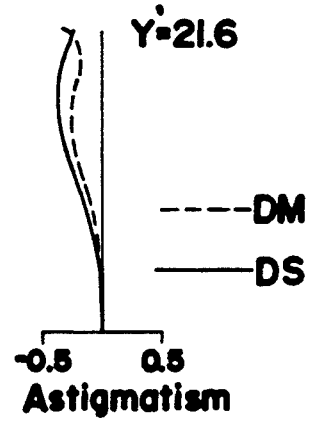
Figure 25C:
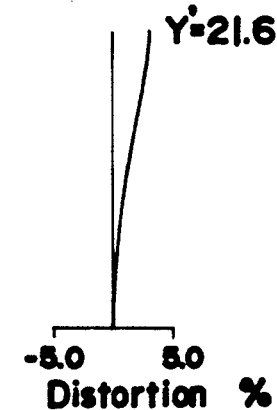
Figure 26A:
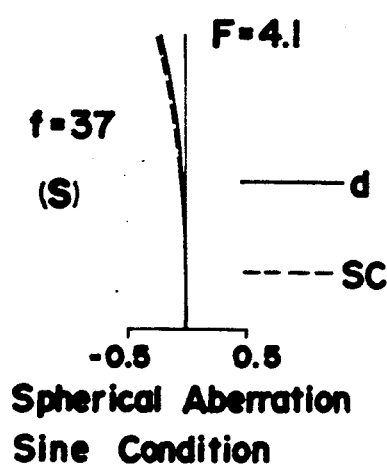
FIG. 26a, 26b and 26c represent the aberration curves of the embodiment 5 for the shortest focal length.
Figure 26B:
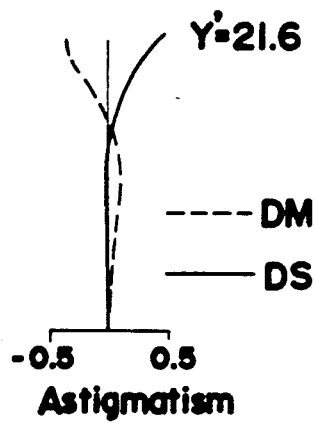
Figure 26C:
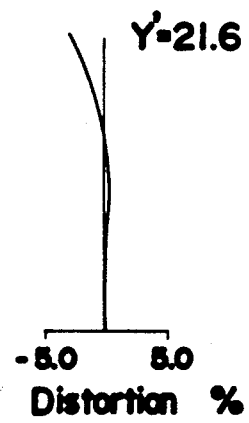
Figure 27A:
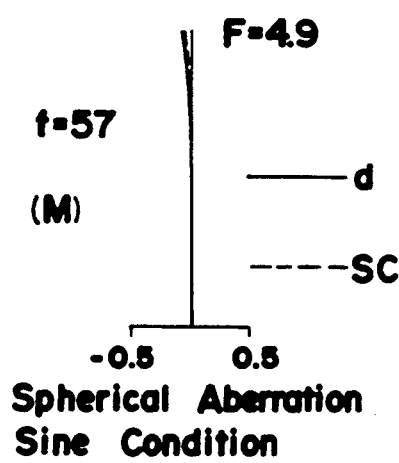
FIG. 27a, 27b and 27c represent the aberration curves of the embodiment 5 for the middle focal lengths.
Figure 27B:
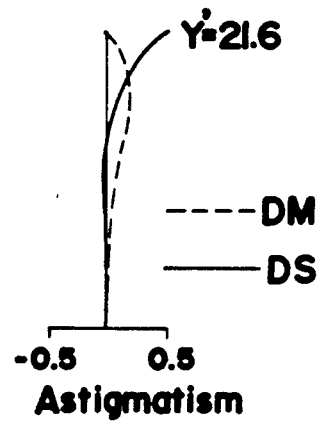
Figure 27C:
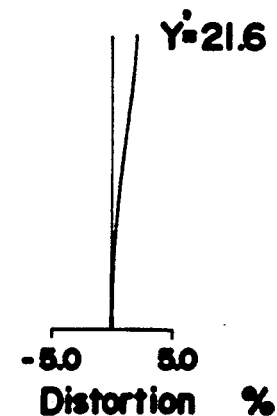
Figure 28A:
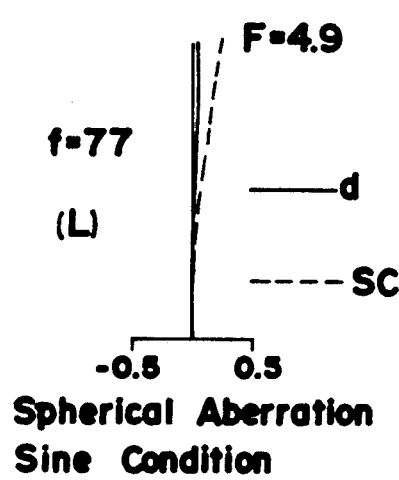
FIG. 28a, 28b and 28c represent the aberration curves of the embodiment 5 for the longest focal length.
Figure 28B:
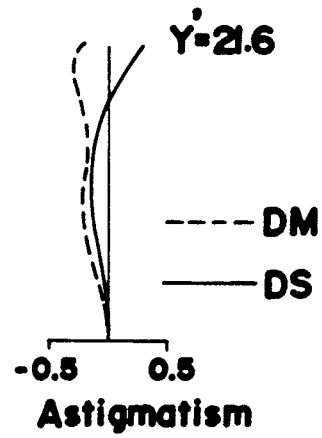
Figure 28C:
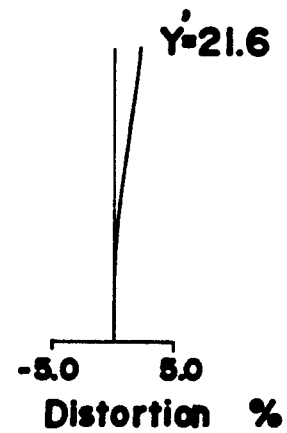
Figure 29A:
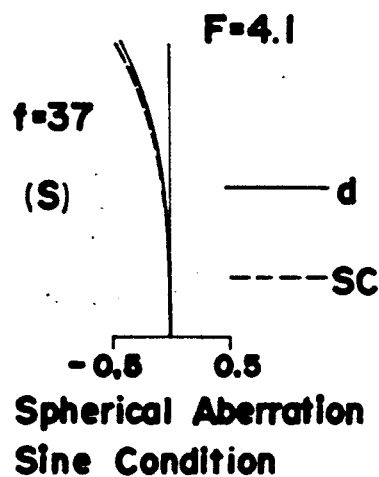
FIG. 29a, 29b and 29c represent the aberration curves of the embodiment 6 for the shortest focal length.
Figure 29B:
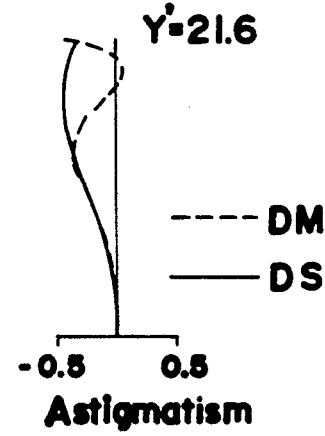
Figure 29C:
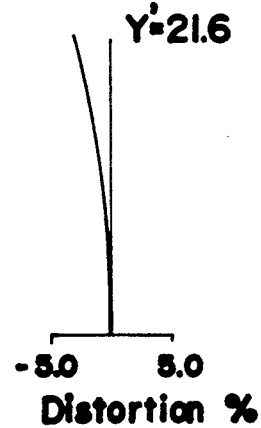
Figure 30A:
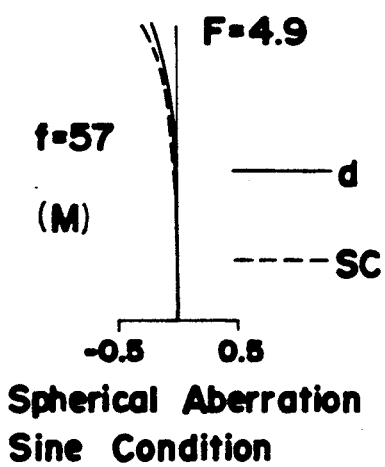
FIG. 30a, 30b and 30c represent the aberration curves of the embodiment 6 for the middle focal length.
Figure 30B:
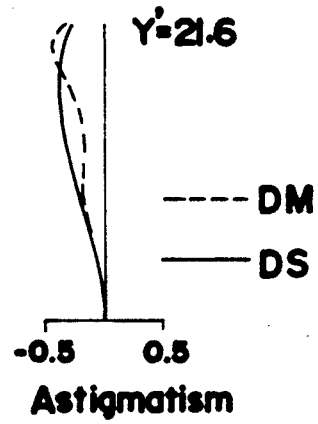
Figure 30C:
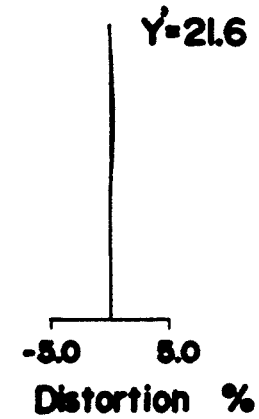
Figure 31A:
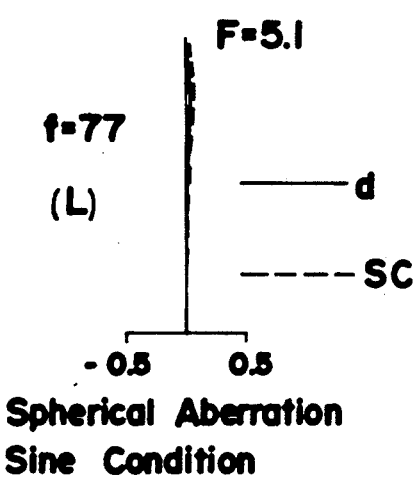
FIG. 31a, 31b and 31c represent the aberration curves of the embodiment 6 for the longest focal length.
Figure 31B:
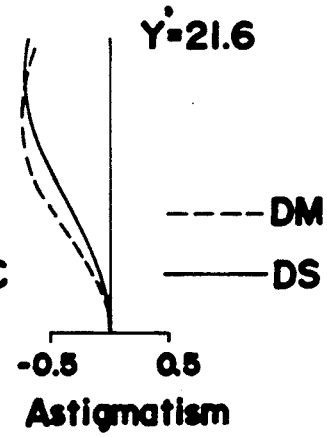
Figure 31C:
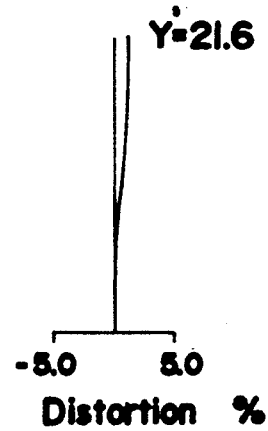
Figure 32A:
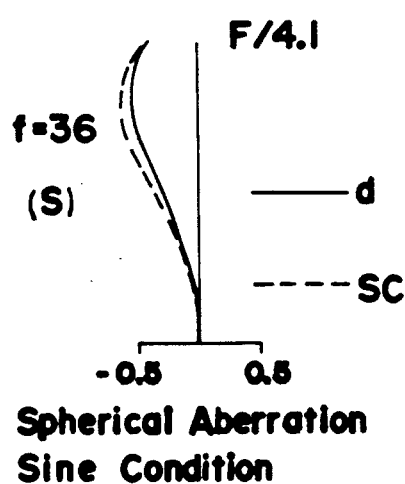
FIG. 32a, 32b and 32c represent the aberration curves of the embodiment 7 for the shortest focal length.
Figure 32B:
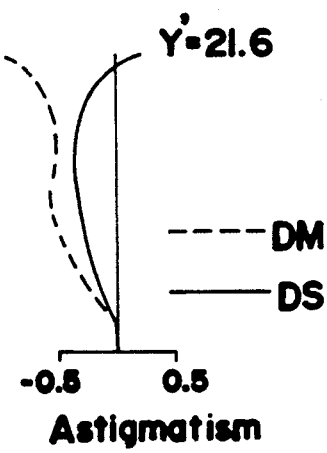
Figure 32C:
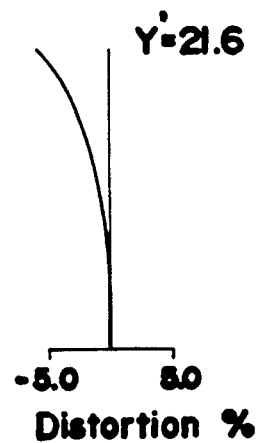
Figure 33A:
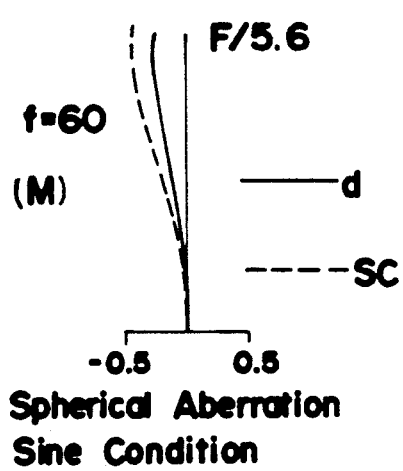
FIG. 33a, 33b and 33c represent the aberration curves of the embodiment 7 for the middle focal length.
Figure 33B:
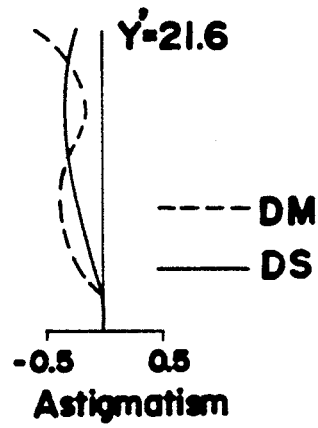
Figure 33C:
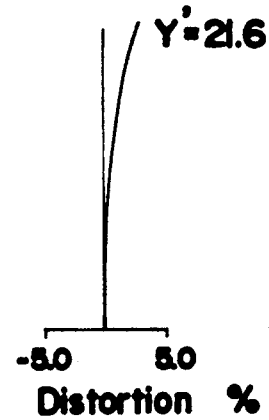
Figure 34A:
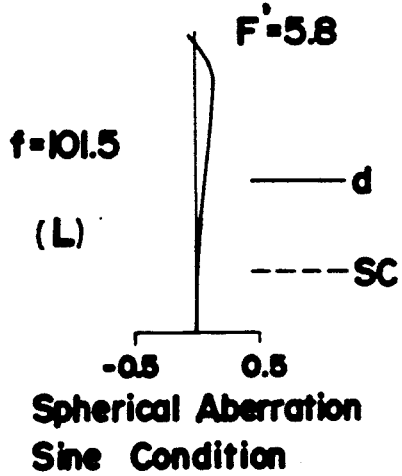
Figure 34B:
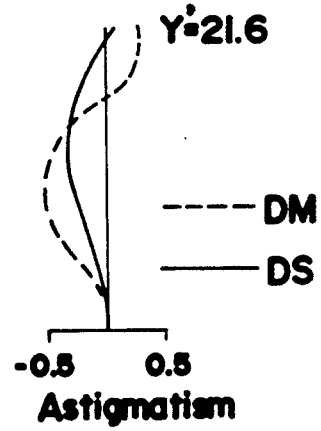
Figure 34C:
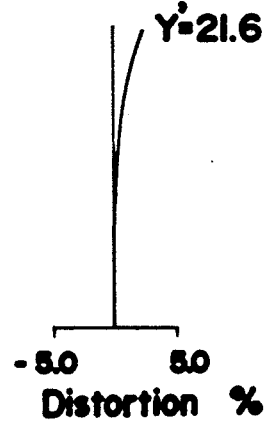
Figure 38A:
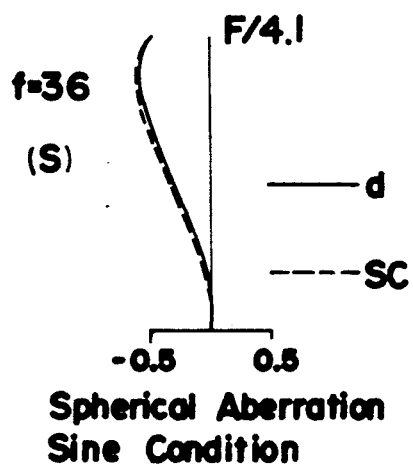
FIG. 38a, 38b and 38c represent the aberration curves of the embodiment 9 for the shortest focal length.
Figure 38B:
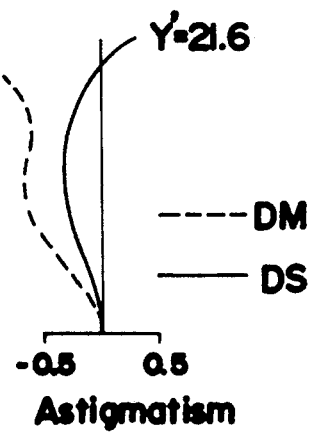
Figure 38C:
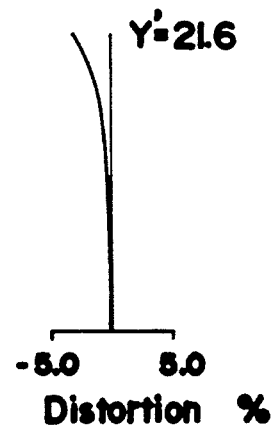
Figure 39A:
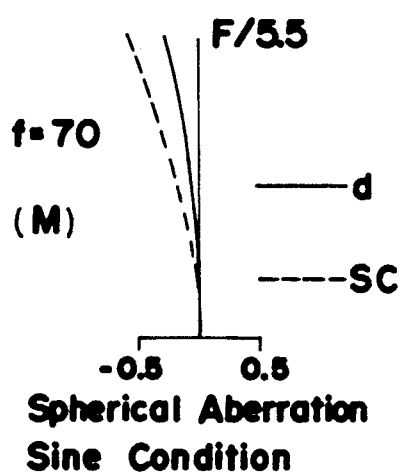
FIG. 39a, 39b and 39c represent the aberration curves of the embodiment 9 for the middle focal length.
Figure 39B:
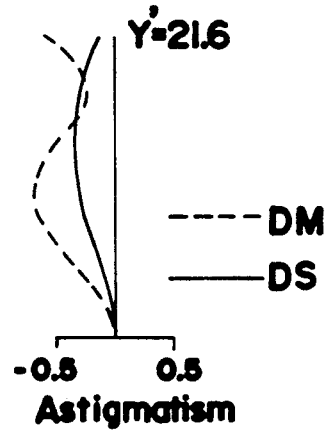
Figure 39C:
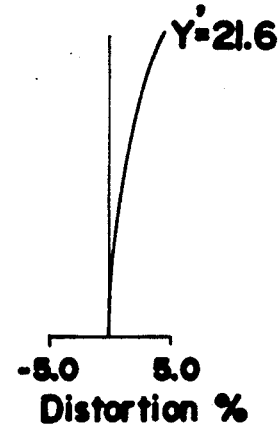
Figure 40A:
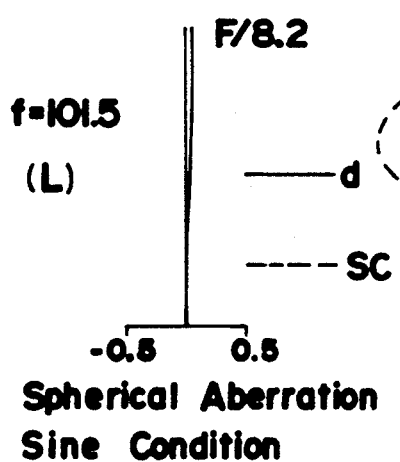
FIG. 40a, 40b and 40c represent the aberration curves of the embodiment 9 for the longest focal length.
Figure 40B:
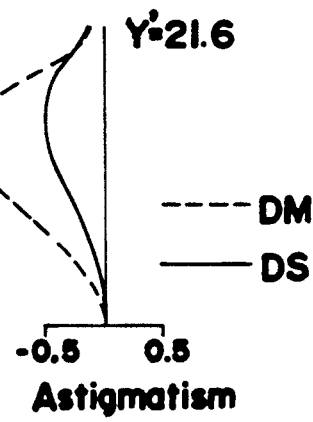
Figure 40C:
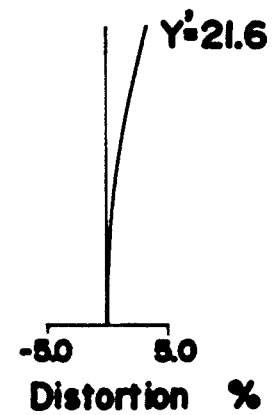
Figure 44A:
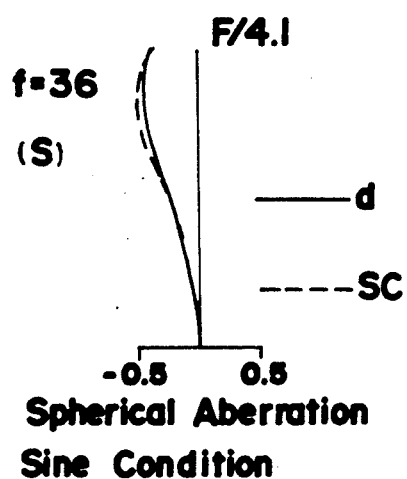
FIG. 44a, 44b and 44c represent the aberration curves of the embodiment 11 for the shortest focal length.
Figure 44B:
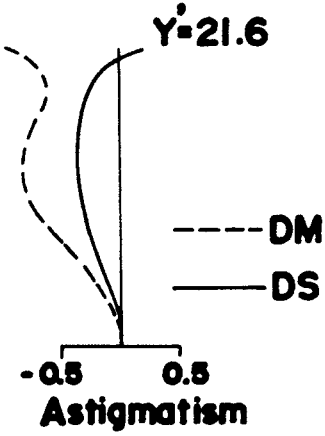
Figure 44C:
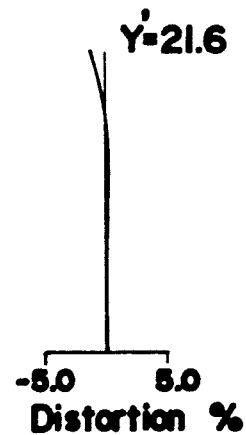
Figure 45A:
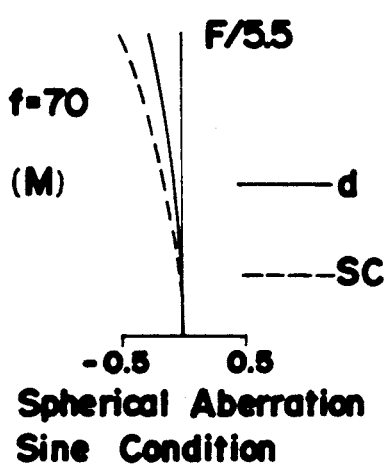
FIG. 45a, 45b and 45c represent the aberration curves of the
embodiment 11 for the middle focal length.
Figure 45B:
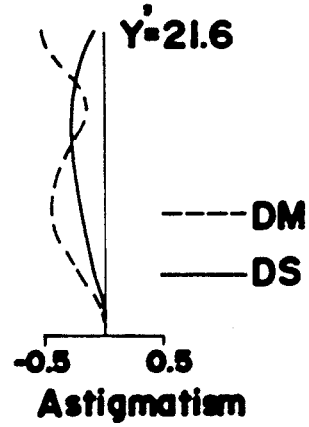
Figure 45C:
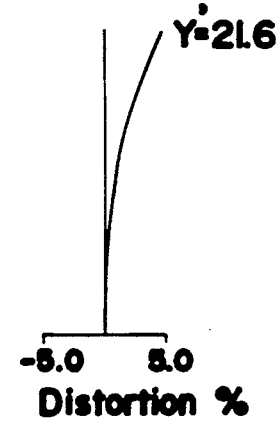
Figure 46A:
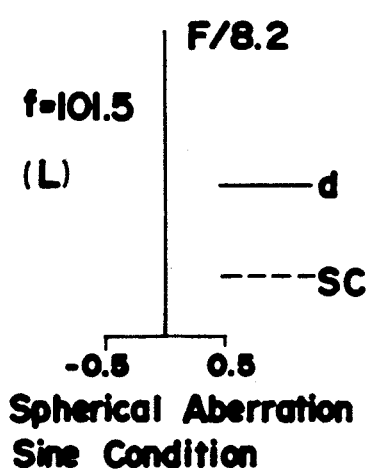
FIG. 46a, 46b and 46c represent the aberration curves of the embodiment 11 for the longest focal length.
Figure 46B:
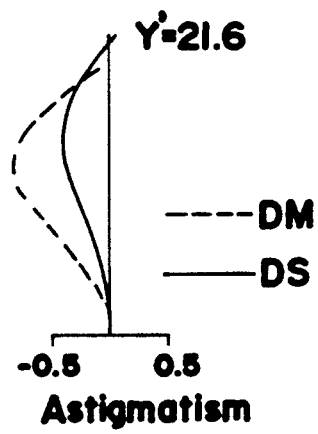
Figure 46C:
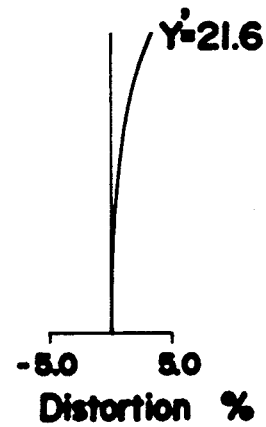
Figure 47A:
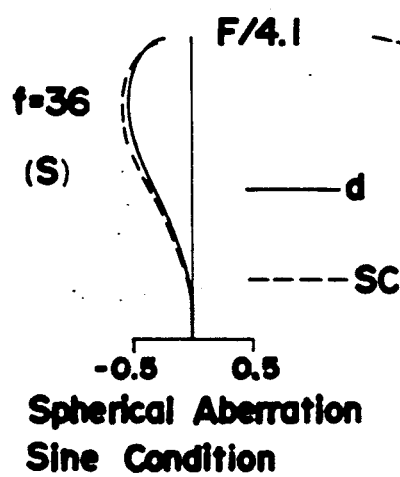
FIG. 47a, 47b and 47c represent the aberration curves of the embodiment 12 for the shortest focal length.
Figure 47B:
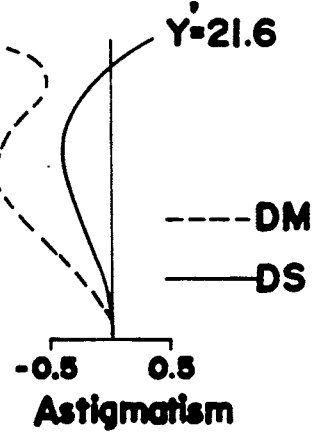
Figure 47C:
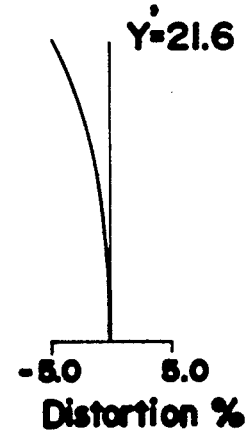
Figure 48A:
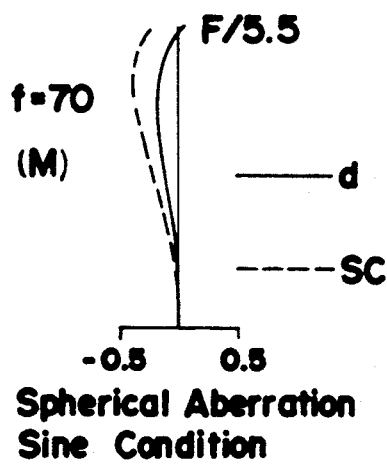
FIG. 48a, 48b and 48c represent the aberration curves of the embodiment 12 for the middle focal length.
Figure 48B:
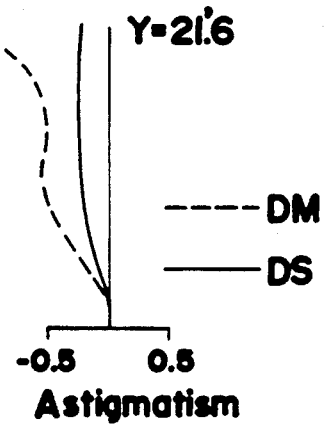
Figure 48C:
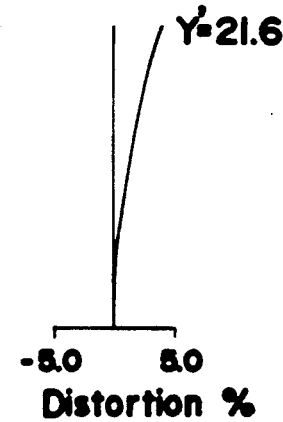
Figure 49A:
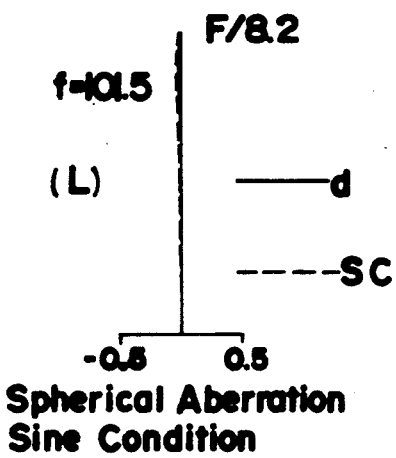
FIG. 49a, 49b and 49c represent the aberration curves of the embodiment 12 for the longest focal length.
Figure 49B:
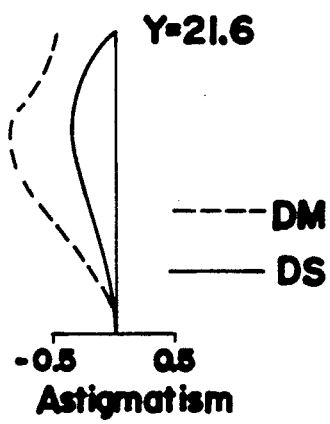
Figure 49C:
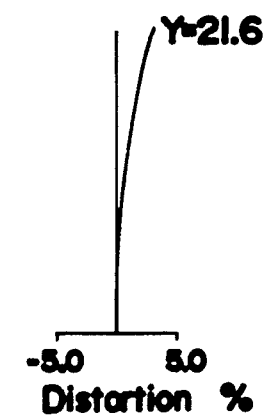

As shown in FIGS. 1 to 13, the present invention provides a compact zoom lens system comprising from the object side to the image side, a first lens unit I of a positive refractive power, a second lens unit II of a negative refractive power with a first variable air space formed between the first and second lens units I and II , a third lens unit III of a positive refractive power, and a fourth lens unit IV of a negative refractive power with a second variable air space formed between the third lens unit III and fourth lens unit IV, wherein the back focal length of the whole lens system for the shortest focal length is less than half of the diagonal length of the image plane, wherein the first lens unit I, the fourth lens unit IV and at least one of the second and third lens units II and III are shiftable from the image side to the object side.

According to the present invention, in the zooming operation from the shortest focal length to the longest focal length, the first variable air space formed between the first lens unit I and the second lens unit II is increased, while the second variable air space formed between the third lens unit III and the fourth lens unit IV is decreased. Therefore, since the zooming effect of the whole lens system can be shared between a plurality of the lens units, the shifting amount of each of the lens units shifted in the zooming operation can be decreased. Furthermore, in the present invention, since the fourth lens unit IV located at the image side end has a relatively strong negative power, an ultra compact lens system in which the back focal length of the whole lens system for the shortest focal length is less than half of the diagonal length of the image plane and in which the total length of the whole lens system (distance from the object side surface of the first lens unit I to the image plane) is extremely short, can be achieved.

Above-mentioned construction of the zoom lens system is referred to as the basic construction of the present invention.

In the present invention, in addition to the basic construction, the third lens unit III or the fourth lens unit IV includes at least an aspherical lens element. Therefore, the zoom ratio is magnified and various aberrations are well corrected.

A zoom lens system of a first type in the present invention, in which the fourth lens unit IV includes at least an aspherical lens element, fulfills the following condition:

$$\frac{|X| - |X_0|}{C_0(N' - N)} > 0 \qquad (1)$$

wherein, X represents the distance along the optical axis measured from an intersection of the basic (paraxial) spherical surface and the optical axis and is expressed as the following equation:

$$X = X_0 + \sum_i A_{2i} Y^{2i},$$

$X_0$ represents the distance along the optical axis measured from the intersection and is expressed as the following equation : $X_0 = C_0 Y^2 / \{1+(1-C_0{}^2 Y^2)\}$, Y represents the distance from the optical axis, $C_0$ represents the radius of curvature of the standard basic surface of the aspherical surface, N represents the refractive index of the material existing at the object side of the aspherical surface, and N' represents the refractive index of the material existing at the image side from the aspherical surface.

Condition (1) relates to the refractive power of the aspherical surface. In case where said aspherical surface has a 7 positive refractive power, if condition (1) is fulfilled, said positive refractive power becomes stronger with distance from the optical axis (Y). Further, in case where said aspherical surface has a negative refractive power, if condition (1) is fulfilled, said negative refractive power becomes weaker with distance from the optical axis. As for a surface around the optical axis, where there is little influence on the spherical aberration, there is no problem, practically, even if condition (1) is a little violated.

Therefore, the zoom lens system of the first type in the present invention, in which the fourth lens unit IV includes at least an aspherical lens element, sufficiently corrects the positive distortion and the positive field curvature which appear mainly around the longest focal length with the magnifying of the zoom ratio and the compactness of the whole lens system, as well as sufficiently corrects the change of comatic aberration in the zooming operation.

Furthermore, it is desirable that the zoom lens system of the first type in the present invention fulfills the following conditions:

$$0.05 < Z/|f_4| < 0.15 \qquad (2)$$

$$1.35 < \beta_{4L}/\beta_{4S} 2.0 \qquad (3)$$

$$1.15 < f_S/|f_4| < 2.0 \qquad (4)$$

$$0.9 < f_{123S}/|f_4| < 1.8 \qquad (5)$$

wherein, Z represents the zoom ratio, $f_4$ represents the focal length of the fourth negative lens unit IV, $\beta_{4L}$ and $\beta_{4S}$ respectively represent the lateral magnifications of the fourth lens unit IV for the longest focal length and for the shortest focal length, $f_S$ represents the focal length of the whole lens system for the shortest focal length, and $f_{123S}$ represents the compound focal length of the first to third lens units I, and for the shortest focal length.

Condition (2) and (3) are for magnifying the zoom ratio keeping the compactness of the whole lens system as well as for sufficiently correcting various aberrations.

If the lower limit of condition (2) is violated, the desirable compactness of the whole lens system can not be achieved in case where the zoom ratio becomes large. On the other hand, if the upper limit of condition (2) is violated, it becomes difficult to sufficiently correct various aberrations in the zooming operation, particularly to correct the field curvature and the comatic aberration, even if the aspherical surface fulfills condition (1).

Condition (3) relates to the zooming effect of the fourth lens unit IV. If the upper limit of condition (3) is violated, it causes to make the refractive power of the fourth lens unit IV so strong, or to increase the shifting amount of the fourth lens unit IV in the zooming operation. Therefore, it becomes difficult to make the fourth lens unit IV simple in construction, and to keep the proper balance of the field curvature in the zooming operation. If the lower limit of condition (3) is violated, in case where the zoom ratio is large, the burden for the zooming effect of the lens units other than the fourth lens unit IV is increased too much, and the desirable compactness of the whole lens system which is one of the objects of the present invention can not be achieved.

Condition (4) defines the refractive power of the fourth lens unit IV. If the lower limit of condition (4) is violated, the desirable compactness of the whole lens system can not be achieved because the back focal length for the shortest focal length becomes too long in case where the zoom ratio is large. On the other hand if the upper limit of condition (4) is violated, it becomes difficult to sufficiently control the changes of various aberrations in the zooming operation, especially to keep proper balance of the change of the astigmatism and the spherical aberration.

Condition (5) shows that the whole lens system forms a telephoto type for the shortest focal length in order to shorten the back focal length. If the upper limit of condition (5) is violated, it becomes impossible to correct the positive distortion even if the aspherical surface fulfills condition (1). If the lower limit of condition (2) is violated, the desirable compactness of the whole lens system can not be achieved in case where the zoom ratio is large, and the zooming effect of the fourth lens unit IV becomes weak.

Furthermore, in the zoom lens system of the first type according to the present invention, in which the fourth lens unit IV includes an aspherical surface, it is desirable the fourth lens unit IV consists of a first positive lens element with an aspherical surface and a second negative lens element from the object side to the image side, and the first positive lens element fulfills the following condition:

$$n_{4-1} < 1.5, \nu_{4-1} < 60 \tag{6}$$

wherein, $n_{4-1}$ represents the refractive index of the first positive lens element of the fourth negative lens unit IV and $\nu_{4-1}$ 1 represents the Abbe number of the first positive lens element of the fourth negative lens unit IV.

It is favorable to employ a plastic lens fulfilling the condition (6) as a lens element with an aspherical surface, resulting in a big labor saving on a manufacturing process.

A zoom lens system of a second type in the present invention, in which the third lens unit includes at least an aspherical lens element, fulfills the following condition (7) aside from condition (1):

$$\frac{|X| - |X_0|}{C_0 (N' - N)} < 0 \tag{7}$$

Condition (7) relates to the refractive power of the aspherical surface as well as condition (1). In case where said aspherical surface has a positive refractive power, if condition (7) is fulfilled, said positive refractive power becomes weaker with distance from the optical axis. On the other hand, in case where said aspherical surface has a negative refractive power, if condition (7) is fulfilled, said negative refractive power becomes stronger with distance from the optical axis. As for a surface around the optical axis, where there is little influence on the spherical aberration, there is no problem, practically, if condition (7) is a little violated.

Therefore, the zoom lens system of the second type in the present invention, in which the third lens unit III includes at least an aspherical lens element fulfilling condition (7), sufficiently corrects the spherical aberration which appears in small F-number, the spherical aberration which appears when the refractive power of each lens unit becomes strong in accordance with the magnifying the zoom ratio and the compactness of the whole lens system, and the change of the comatic aberration in the zooming operation.

Furthermore, it is desirable that the zoom lens system of the second type in the present invention, in which the third lens unit III includes at least an aspherical lens element, fulfills the following conditions:

$$0.65 < f_3/|f_4| < 1.0 \tag{8}$$

$$0.08 < Z/f_3 < 1.50 \tag{9}$$

wherein, $f_3$ represents the focal length of the third positive lens unit III.

Condition (8) is for magnifying the zoom ratio and the aperture ratio keeping the compactness of the whole lens system, as well as for sufficiently correcting various aberrations. If the lower limit of condition (8) is violated, it becomes difficult to sufficiently correct the spherical aberration in case where the zoom ratio and the aperture ratio are large. On the other hand, if the upper limit of condition (8) is violated, it becomes difficult to correct the change of various aberrations in the zooming operation, particularly to keep the proper balance of the change of the field curvature and the change of the comatic aberration.

Condition (9) is for magnifying the zoom ratio keeping the compactness of the whole lens system and for sufficiently correcting the change of various aberrations. If the upper limit of condition (9) is violated, it becomes difficult to sufficiently correct the change of various aberrations in the zooming operation even if the aspherical surface fulfills condition (7). On the other hand, if the lower limit of condition (9) is violated, it becomes difficult to keep the compactness of the whole lens system in case where the zoom ratio is large.

Furthermore, in the zoom lens system of the second type of the present invention, an aspherical surface is employed on an object side surface convex to the object side in the third positive lens unit III. Although the third lens unit III has a strong refractive power, the spherical aberration is sufficiently corrected owing to the above-mentioned aspherical surface.

In the zoom lens system of the second type according to the present invention, it is desirable that the third positive lens unit III includes at least an aspherical surface on a positive lens element and fulfills the following condition:

$$n_{3-P} < 1.5, \nu_{3-P} < 60 \tag{10}$$

wherein, $n_{3-P}$ represents the refractive index of the positive lens element with the aspherical surface of the third positive lens unit III and $\nu_{3-P}$ represents the Abbe number of the positive lens element with the aspherical surface of the third positive lens unit.

It is favorable to employ a plastic lens which fulfills condition (10) as a lens element with an aspherical surface, resulting in a big labor saving on a manufacturing process.

According to the present invention, it is desirable to construct each of the lens units of the above-mentioned zoom lens system of the first and second types as described below. Namely, the first lens unit I includes at least a negative lens element having an object side surface convex to the object side, and a positive lens element having an image side surface concave to the image side at the image side end. Such construction is effective for decreasing the changes of various aberrations, especially the change of the astigmatism, when the first lens unit I is shifted for focusing on an adjacent object.

The second lens unit II includes at least a negative lens element and a positive lens element. Such construction is effective for keeping the proper balance of the chromatic aberration, especially the lateral chromatic aberration, during the zooming operation.

The third lens unit II comprises a triplet type lens consisting of a positive lens element, a negative lens element and a positive lens element, or modified type thereof. It is most desirable for correcting the spherical aberration and the comatic aberration.

The fourth lens unit IV includes at least a negative meniscus lens element at the image side end. It is effective for achieving the desirable compactness of the whole lens system and for correcting the field curvature around the shortest focal length.

The following conditions are for magnifying the zoom ratio, under the basic construction mentioned above. A zoom lens system which fulfills the following conditions is referred to as the zoom lens system of the third type:

$$10 < L_2 \times \frac{fs}{f_L} < 33 \tag{11}$$

$$1.9 < \left|\frac{\phi_2}{\phi_1}\right| < 6.0 \tag{12}$$

$$0.2 < \frac{\beta_{4L}}{\beta_{4S}} \times \frac{fs}{f_L} < 0.75 \tag{13}$$

wherein, $L_2$ represents the length from the front apex of the lens element of the object side end of the second negative lens unit II to a film, $f_L$ represents the focal length of the whole lens system for the longest focal length, $\phi_1$ represents the refractive power of the first positive lens unit I and $\phi_2$ represents the refractive power of the second negative lens unit II.

Condition (11) is for keeping the compactness of the whole lens system while magnifying the zoom ratio.

If the upper limit of condition (11) is violated, the desirable compactness of the whole lens system, which is one of the objects of the present invention, can not be achieved because the total length of the whole lens system becomes too much long. And what is worse, it becomes difficult to correct the spherical aberration which appears in the third lens unit III or the fourth lens unit IV.

If the lower limit of condition (11) is violated, in case where the zoom ratio is large, the back focal distance becomes short. Further, the diameter of the fourth lens unit IV becomes large or the respective lengths of the second and third lens units II and IV become extremely short. Therefore, it is unfavorable for sufficiently correcting the changes of various aberrations in the zooming operation.

Condition (12) defines the refractive powers of the first and second lens units I and II in order to correct the changes in various aberrations in the zooming operation and keep the compactness of the whole lens system.

If the upper limit of condition (12) is violated, the compound negative refractive power of the first and second lens units I and becomes too strong, with the result that it becomes difficult to correct the spherical aberration which appears in the third and fourth lens units III and IV. Further, the total length of the whole lens system for the shortest focal length becomes too long.

If the lower limit of condition (12) is violated, it becomes difficult to magnifying the zoom ratio because the refractive power of the second lens unit II becomes too week. Therefore, it is unfavorable to providing sufficient illumination for the image surface in the shortest focal length.

Condition (13) relates to the zooming effect of the fourth lens unit IV.

If the upper limit of condition (13) is violated, it becomes difficult to correct the spherical aberration in the longest focal length without extremely large the F-number.

If the lower limit of condition (13) is violated, the burden for the zooming effect of the lens units other than the fourth lens unit IV is too much increased, and it becomes difficult to control the balance of the distortion in the zooming operation.

It is more desirable to fulfill the following condition (13)' instead of condition (13):

$$0.2 < \frac{\beta_{4L}}{\beta_{4S}} \times \frac{fs}{f_L} < 0.70 \tag{13'}$$

Furthermore, in the present invention, it is preferable that the zoom lens system of the third type fulfills the following conditions:

$$0.9 < \frac{L_3}{FM} < 4.0 \tag{14}$$

$$0.14 < \frac{\Delta d_{23}}{fs} < 2.0 \tag{15}$$

$$0.15 < \frac{f_1}{\Delta T_1} \times \frac{fs}{f_L} < 2.0 \tag{16}$$

wherein, $L_3$ represents the length from the front apex of the lens element of the object side end of the third positive lens unit III to a film, FM represents the diagonal length of the image plane, $\Delta d_{23}$ represents the difference between the air spaces, formed between the second negative lens unit II and the third positive lens unit III, for the shortest focal length and for the longest focal length, $f_1$ represents the focal length of the first positive lens unit I, and $\Delta T_1$ represents the shifting amount of the first positive lens unit I in the zooming operation from the shortest focal length to the longest focal length.

Condition (14), is for keeping the compactness of the whole lens system as well as for maintaining the high optical performance.

If the upper limit of condition (14) is violated, the same as in the case when the upper limit of condition (11) is violated, the compactness of the whole lens system can not be achieved, that is, the object of the present invention can not be attained.

If the lower limit of condition (14) is violated, the length of the third lens unit III becomes too short. Therefore, it becomes difficult to correct the changes of various aberrations in the zooming operation, particularly to correct the spherical aberration and the comatic aberration to be well balanced, which are corrected by the third lens unit III mainly. Or, it becomes difficult to magnify the zoom ratio because the air space formed between the third and the fourth lens units III and IV in the shortest focal length becomes too short. If the back focal length becomes too short in case where the lower limit of condition (14) is violated, the diameter of the fourth lens system IV becomes too much large, same as condition (11) is violated.

Condition (15) defines the change of the distance of the variable air space formed between the second and third lens units II and III by the zooming operation in relation to the focal length of the whole lens system in the shortest focal length.

If the upper limit of condition (15) is violated, it becomes difficult to sufficiently correct the changes of various aberration in the zooming operation, particularly to correct the spherical aberration and the comatic aberration.

If the lower limit of condition (15) is violated, it becomes difficult to magnify the zoom ratio because the changed distance of variable air space formed between the second and third lens units II and III becomes short. In order to magnify the zoom ratio under this state, it is necessary to strengthen the refractive power of each lens unit, with the result that the changes of various aberrations in the zooming operation become large.

The shifting distance of the first lens unit I is defined by condition (16), in case where the second lens unit II is fixed in the zooming operation.

If the upper limit of condition (16) is violated, the desirable zoom ratio shared in the second lens unit II can not be achieved.

If the lower limit of condition (16) is violated, the shifting amount of the first lens unit I is increased and the total length of the whole lens system for the longest focal length becomes long. Therefore, the compactness of the whole lens system including a lens-barrel can not be achieved.

It is desirable, in the present invention, the zoom lens system of the third type, as well as the above-mentioned zoom lens system of the first type, includes at least an aspherical lens element in the fourth lens unit IV and fulfills the above-mentioned condition (1).

As for the lens element with an aspherical surface, it is preferable to fulfill the following condition:

$$n_4 < 1.6, \nu_4 < 60 \quad (17)$$

wherein, $n_4$ represents the refractive index of the lens element with an aspherical surface and $\nu_4$ represents the Abbe number of the lens element with an aspherical surface.

It is favorable to employ a plastic lens fulfilling condition (17), as a lens element with an aspherical surface, resulting in a big labor saving on a manufacturing process.

An preferable concrete construction of the above-mentioned zoom lens system of the third type is described below. Namely, in the zooming operation, the first lens unit I and the fourth lens unit IV shift together from the image side to the object side, the third lens unit III shifts, and the second lens unit II is fixed. Owing to the above-mentioned construction, the shifting of each lens unit in the zooming operation becomes simple and as a result it is advantageous for constructing a lens-barrel.

In addition, the first lens unit I includes at least a positive lens element and a negative lens element. In order to be decreased the shifting distance of the first lens unit I in the zooming operation, the first lens unit I requires relatively strong refractive power. Thus, the above-mentioned construction is favorable.

The second lens unit II includes at least a positive lens element and two negative lens elements. Such construction suppress the change of the spherical aberration in the zooming operation.

The third lens unit III comprises, from the object side, a positive lens element, a positive lens element, a negative lens element and a positive lens element.

The fourth lens unit IV includes at least a negative meniscus lens element at the image side end. Such construction is effective for achieving the desirable compactness of the whole lens system and for correcting the field curvature around the shortest focal length.

The following Tables 1 to 13 disclose, respectively, the embodiments 1 to 13 of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the lens element from the object to image side, and finally, $\nu$ equals the Abbe number and the sub numbers refer to the lens elements from the object to image side.

The embodiments 7 to 13 correspond to the zoom lens system of the third type in the present invention.

According to the preset invention, the zoom lens system is a four components type. As described in the embodiment 13, however, the zoom lens system includes at the image side end a fixed lens component which has a relatively weak refractive power. Such a modification is also within the scope of the present invention.

Although the second lens unit II is fixed in the zooming operation in all of the embodiments, it is favorable for the designing the lens system to construct the second lens unit shiftable if there is no problem for the construction of the lens-barrel. For example, if the second lens unit II is shiftable toward the object side in the zooming operation from the shortest focal length to the longest focal length, the whole lens system in the shortest focal length becomes even more compact. In addition, if the second lens unit II is shiftable a very small distance, it is favorable to correct variable aberrations.

In all the embodiments, the second lens unit II including the aperture stop AS is fixed in the zooming operation. Such a modification is, however, further possible in which the third lens unit III includes the aperture stop AS and is fixed in the zooming operation.

The change of the variable air space formed between the second lens unit II and the third lens unit III by the zooming operation is relatively smaller than the other air space. Therefore, it is possible to shift together the second lens unit and the third lens unit III in a zoom lens system whose zoom ratio is relatively small.

Although the present invention has fully been described in connection with the preferred embodiment thereof with reference to the accompanying drawings, it is to be noted that various changes and modifications are apparent to those skilled in the art. Such changes and modifications are to be understood as being included within the scope for the present invention as defined by the appended claims.

TABLE 1

[Embodiment 1]

| | f = 37.0~50.0~67.0 | | $F_{No.}$ = 3.6~4.2~4.2 | |
|---|---|---|---|---|
| | Radius of curvature | Axial distance | Refractive index (Nd) | Abbe number ($\nu$d) |
| $r_1$ | 64.955 | | | |
| | | $d_1$ 1.500 | $N_1$ 1.84666 | $\nu_1$ 23.83 |
| $r_2$ | 31.220 | | | |
| | | $d_2$ 3.500 | $N_2$ 1.61720 | $\nu_2$ 54.00 |
| $r_3$ | 184.176 | | | |
| | | $d_3$ 0.150 | | |
| $r_4$ | 19.836 | | | |
| | | $d_4$ 3.700 | $N_3$ 1.61272 | $\nu_3$ 58.52 |
| $r_5$ | 44.894 | | | |
| | | $d_5$ 2.000~7.432~15.643 | | |
| $r_6$ | −46.910 | | | |
| | | $d_6$ 1.100 | $N_4$ 1.75450 | $\nu_4$ 51.57 |
| $r_7$ | 18.835 | | | |
| | | $d_7$ 1.700 | $N_5$ 1.83350 | $\nu_5$ 21.00 |
| $r_8$ | 42.230 | | | |

TABLE 1-continued

[Embodiment 1]

|  |  |  |  |  |
|---|---|---|---|---|
| | $d_8$ 2.000 | | | |
| $r_9$ ∞ | | | | |
| | $d_9$ 3.788~1.679~1.000 | | | |
| $r_{10}$ 59.871 | | | | |
| | $d_{10}$ 1.559 | $N_6$ 1.72900 | $\nu_6$ 53.48 | |
| $r_{11}$ −45.603 | | | | |
| | $d_{11}$ 0.150 | | | |
| $r_{12}$ 18.733 | | | | |
| | $d_{12}$ 1.183 | $N_7$ 1.70800 | $\nu_7$ 53.23 | |
| $r_{13}$ 213.296 | | | | |
| | $d_{13}$ 0.375 | | | |
| $r_{14}$ −46.959 | | | | |
| | $d_{14}$ 1.546 | $N_8$ 1.84666 | $\nu_8$ 23.83 | |
| $r_{15}$ 23.797 | | | | |
| | $d_{15}$ 3.000 | | | |
| $r_{16}$ 59.164 | | | | |
| | $d_{16}$ 2.664 | $N_9$ 1.67270 | $\nu_9$ 32.22 | |
| $r_{17}$ −24.447 | | | | |
| | $d_{17}$ 15.240~9.399~3.028 | | | |
| $r_{18}$ *−17.114 | | | | |
| | $d_{18}$ 2.500 | $N_{10}$ 1.72000 | $\nu_{10}$ 54.71 | |
| $r_{19}$ −111.763 | | | | |
| $\Sigma d = 47.654$~$45.136$~$46.297$ | | | | |

Aspheric coefficients $r_{18}$: $A_4 = 0.49044 \times 10^{-5}$  $A_6 = 0.27592 \times 10^{-6}$
$A_8 = -0.39839 \times 10^{-8}$  $A_{10} = 0.26531 \times 10^{-10}$
$A_{12} = -0.64838 \times 10^{-13}$

TABLE 2

[Embodiment 2]

$f = 37.0$~$57.0$~$77.0$     $F_{No.} = 4.1$~$4.9$~$4.9$

| Radius of curvature | Axial distance | Refractive index (Nd) | Abbe number ($\nu d$) |
|---|---|---|---|
| $r_1$ 54.496 | | | |
| | $d_1$ 1.500 | $N_1$ 1.84666 | $\nu_1$ 23.83 |
| $r_2$ 30.960 | | | |
| | $d_2$ 4.800 | $N_2$ 1.58913 | $\nu_2$ 61.11 |
| $r_3$ 294.662 | | | |
| | $d_3$ 0.150 | | |
| $r_4$ 21.573 | | | |
| | $d_4$ 4.100 | $N_3$ 1.51680 | $\nu_3$ 64.20 |
| $r_5$ 45.418 | | | |
| | $d_5$ 2.800~12.450~20.500 | | |
| $r_6$ −73.252 | | | |
| | $d_6$ 1.100 | $N_4$ 1.69680 | $\nu_4$ 56.47 |
| $r_7$ 12.819 | | | |
| | $d_7$ 0.886 | | |
| $r_8$ 13.366 | | | |
| | $d_8$ 1.900 | $N_5$ 1.84666 | $\nu_5$ 23.83 |
| $r_9$ 23.907 | | | |
| | $d_9$ 2.000 | | |
| $r_{10}$ ∞ | | | |
| | $d_{10}$ 2.206~1.128~1.0000 | | |
| $r_{11}$ 68.671 | | | |
| | $d_{11}$ 1.565 | $N_6$ 1.61762 | $\nu_6$ 52.70 |
| $r_{12}$ −50.609 | | | |
| | $d_{12}$ 0.150 | | |
| $r_{13}$ 17.952 | | | |
| | $d_{13}$ 1.800 | $N_7$ 1.62280 | $\nu_7$ 56.88 |
| $r_{14}$ −791.321 | | | |
| | $d_{14}$ 0.906 | | |
| $r_{15}$ −41.321 | | | |
| | $d_{15}$ 1.566 | $N_8$ 1.84666 | $\nu_8$ 23.83 |
| $r_{16}$ 28.156 | | | |
| | $d_{16}$ 2.683 | | |
| $r_{17}$ *68.780 | | | |
| | $d_{17}$ 3.700 | $N_9$ 1.66998 | $\nu_9$ 39.23 |
| $r_{18}$ −20.644 | | | |
| | $d_{18}$ 18.85~9.798~3.028 | | |
| $r_{19}$ *−16.946 | | | |
| | $d_{19}$ 2.500 | $N_{10}$ 1.69680 | $\nu_{10}$ 56.47 |
| $r_{20}$ −113.133 | | | |
| $\Sigma d = 55.162$~$54.682$~$55.834$ | | | |

Aspheric coefficients

TABLE 2-continued

[Embodiment 2]

$r_{17}$: $A_4 = 0.24524 \times 10^{-4}$  $A_6 = -0.90078 \times 10^{-7}$
$A_8 = 0.29760 \times 10^{-6}$  $A_{10} = -0.28852 \times 10^{-10}$
$A_{12} = -0.82387 \times 10^{-13}$ $r_{19}$: $A_4 = 0.20193 \times 10^{-4}$  $A_6 = 0.76861 \times 10^{-7}$
$A_8 = -0.35400 \times 10^{-9}$  $A_{10} = 0.52644 \times 10^{-11}$
$A_{12} = -0.12983 \times 10^{-13}$

TABLE 3

[Embodiment 3]

$f = 37.0$~$57.0$~$77.0$     $F_{No.} = 4.1$~$4.9$~$5.1$

| Radius of curvature | Axial distance | Refractive index (Nd) | Abbe number ($\nu d$) |
|---|---|---|---|
| $r_1$ 53.412 | | | |
| | $d_1$ 1.500 | $N_1$ 1.84666 | $\nu_1$ 23.83 |
| $r_2$ 30.376 | | | |
| | $d_2$ 4.900 | $N_2$ 1.58913 | $\nu_2$ 61.11 |
| $r_3$ 216.947 | | | |
| | $d_3$ 0.150 | | |
| $r_4$ 21.237 | | | |
| | $d_4$ 4.100 | $N_3$ 1.51680 | $\nu_3$ 64.20 |
| $r_5$ 46.262 | | | |
| | $d_5$ 1.500~11.150~19.200 | | |
| $r_6$ −62.126 | | | |
| | $d_6$ 1.100 | $N_4$ 1.69680 | $\nu_4$ 56.47 |
| $r_7$ 12.840 | | | |
| | $d_7$ 0.728 | | |
| $r_8$ 13.385 | | | |
| | $d_8$ 1.600 | $N_5$ 1.84666 | $\nu_5$ 23.83 |
| $r_9$ 23.315 | | | |
| | $d_9$ 2.000 | | |
| $r_{10}$ ∞ | | | |
| | $d_{10}$ 3.667~1.871~1.000 | | |
| $r_{11}$ 64.469 | | | |
| | $d_{11}$ 1.000 | $N_6$ 1.61272 | $\nu_6$ 58.52 |
| $r_{12}$ −50.288 | | | |
| | $d_{12}$ 0.150 | | |
| $r_{13}$ *18.186 | | | |
| | $d_{13}$ 2.000 | $N_7$ 1.49140 | $\nu_7$ 57.82 |
| $r_{14}$ −57.739 | | | |
| | $d_{14}$ 0.944 | | |
| $r_{15}$ −44.599 | | | |
| | $d_{15}$ 1.566 | $N_8$ 1.84666 | $\nu_8$ 23.83 |
| $r_{16}$ 27.064 | | | |
| | $d_{16}$ 2.860 | | |
| $r_{17}$ 81.547 | | | |
| | $d_{17}$ 3.200 | $N_9$ 1.66998 | $\nu_9$ 39.23 |
| $r_{18}$ −20.288 | | | |
| | $d_{18}$ 17.969~9.226~3.000 | | |
| $r_{19}$ *−16.747 | | | |
| | $d_{19}$ 1.500 | $N_{10}$ 1.49140 | $\nu_{10}$ 57.82 |
| $r_{20}$ −17.143 | | | |
| | $d_{20}$ 0.200 | | |
| $r_{21}$ −17.162 | | | |
| | $d_{21}$ 1.500 | $N_{11}$ 1.69680 | $\nu_{11}$ 56.47 |
| $r_{22}$ −84.860 | | | |
| $\Sigma d = 54.133$~$53.244$~$53.726$ | | | |

Aspheric coefficients $r_{13}$: $A_4 = -0.31815 \times 10^{-4}$  $A_6 = -0.21422 \times 10^{-6}$
$A_8 = 0.41218 \times 10^{-8}$  $A_{10} = 0.53232 \times 10^{-10}$
$A_{12} = 0.14891 \times 10^{-11}$ $r_{19}$: $A_4 = 0.38538 \times 10^{-4}$  $A_6 = -0.35379 \times 10^{-6}$
$A_8 = 0.67620 \times 10^{-8}$  $A_{10} = -0.48971 \times 10^{-10}$
$A_{12} = 0.12423 \times 10^{-12}$

TABLE 4

[Embodiment 4]

$f = 39.0$~$50.0$~$62.0$     $F_{No.} = 2.8$~$3.1$~$3.2$

| Radius of curvature | Axial distance | Refractive index (Nd) | Abbe number ($\nu d$) |
|---|---|---|---|
| $r_1$ 69.083 | | | |
| | $d_1$ 1.500 | $N_1$ 1.84666 | $\nu_1$ 23.83 |

TABLE 4-continued

[Embodiment 4]

| | Radius | Axial distance | Refractive index | Abbe number |
|---|---|---|---|---|
| $r_2$ | 29.274 | | | |
| | | $d_2$ 3.500 | $N_2$ 1.69680 | $v_2$ 56.47 |
| $r_3$ | 91.962 | | | |
| | | $d_3$ 0.150 | | |
| $r_4$ | 20.681 | | | |
| | | $d_4$ 4.200 | $N_3$ 1.69680 | $v_3$ 56.47 |
| $r_5$ | 62.885 | | | |
| | | $d_5$ 2.200~7.032~12.290 | | |
| $r_6$ | −68.144 | | | |
| | | $d_6$ 1.100 | $N_4$ 1.72000 | $v_4$ 54.71 |
| $r_7$ | 16.714 | | | |
| | | $d_7$ 1.700 | $N_5$ 1.84666 | $v_5$ 23.83 |
| $r_8$ | 29.814 | | | |
| | | $d_8$ 2.000 | | |
| $r_9$ | ∞ | | | |
| | | $d_9$ 4.346~3.370~2.592 | | |
| $r_{10}$ | *19.016 | | | |
| | | $d_{10}$ 1.781 | $N_6$ 1.70500 | $v_6$ 54.86 |
| $r_{11}$ | −329.636 | | | |
| | | $d_{11}$ 0.508 | | |
| $r_{12}$ | −398.166 | | | |
| | | $d_{12}$ 1.481 | $N_7$ 1.80518 | $v_7$ 25.43 |
| $r_{13}$ | 26.001 | | | |
| | | $d_{13}$ 2.262 | | |
| $r_{14}$ | 45.032 | | | |
| | | $d_{14}$ 3.050 | $N_8$ 1.66446 | $v_8$ 35.84 |
| $r_{15}$ | −29.396 | | | |
| | | $d_{15}$ 16.274~9.300~3.028 | | |
| $r_{16}$ | −18.030 | | | |
| | | $d_{16}$ 2.500 | $N_9$ 1.66446 | $v_9$ 35.84 |
| $r_{17}$ | −83.202 | | | |

$\Sigma d = 48.552\sim45.434\sim43.642$

Aspheric coefficients $r_{10}$: $A_4 = -0.27572 \times 10^{-4}$  $A_6 = -0.47719 \times 10^{-7}$
$A_8 = 0.40999 \times 10^{-8}$  $A_{10} = -0.72437 \times 10^{-10}$
$A_{12} = -0.73952 \times 10^{-12}$

TABLE 5

[Embodiment 5]

$f = 37.0\sim57.0\sim77.0$  $F_{No.} = 4.1\sim4.9\sim4.9$

| | Radius of curvature | Axial distance | Refractive index (Nd) | Abbe number ($v_d$) |
|---|---|---|---|---|
| $r_1$ | 54.496 | | | |
| | | $d_1$ 1.500 | $N_1$ 1.84666 | $v_1$ 23.83 |
| $r_2$ | 30.960 | | | |
| | | $d_2$ 4.800 | $N_2$ 1.58913 | $v_2$ 61.11 |
| $r_3$ | 294.662 | | | |
| | | $d_3$ 0.150 | | |
| $r_4$ | 21.573 | | | |
| | | $d_4$ 4.100 | $N_3$ 1.51680 | $v_3$ 64.20 |
| $r_5$ | 45.418 | | | |
| | | $d_5$ 2.800~12.450~20.500 | | |
| $r_6$ | −73.252 | | | |
| | | $d_6$ 1.100 | $N_4$ 1.69680 | $v_4$ 56.47 |
| $r_7$ | 12.819 | | | |
| | | $d_7$ 0.886 | | |
| $r_8$ | 13.366 | | | |
| | | $d_8$ 1.900 | $N_5$ 1.84666 | $v_5$ 23.83 |
| $r_9$ | 23.907 | | | |
| | | $d_9$ 2.000 | | |
| $r_{10}$ | ∞ | | | |
| | | $d_{10}$ 2.206~1.128~1.000 | | |
| $r_{11}$ | 68.671 | | | |
| | | $d_{11}$ 1.565 | $N_6$ 1.61762 | $v_6$ 52.70 |
| $r_{12}$ | −50.609 | | | |
| | | $d_{12}$ 0.150 | | |
| $r_{13}$ | 17.952 | | | |
| | | $d_{13}$ 1.800 | $N_7$ 1.62280 | $v_7$ 56.88 |
| $r_{14}$ | −791.321 | | | |
| | | $d_{14}$ 0.906 | | |
| $r_{15}$ | −41.321 | | | |
| | | $d_{15}$ 1.566 | $N_8$ 1.84666 | $v_8$ 23.83 |
| $r_{16}$ | 28.156 | | | |
| | | $d_{16}$ 2.683 | | |
| $r_{17}$ | *68.780 | | | |

TABLE 5-continued

[Embodiment 5]

| | | | | |
|---|---|---|---|---|
| | | $d_{17}$ 3.700 | $N_9$ 1.66998 | $v_9$ 39.23 |
| $r_{18}$ | −20.644 | | | |
| | | $d_{18}$ 18.85~9.798~3.028 | | |
| $r_{19}$ | *−16.946 | | | |
| | | $d_{19}$ 2.500 | $N_{10}$ 1.69680 | $v_{10}$ 56.47 |
| $r_{20}$ | −113.133 | | | |

$\Sigma d = 55.162\sim54.682\sim55.834$

Aspheric coefficients $r_{17}$: $A_4 = -0.24524 \times 10^{-4}$  $A_6 = -0.90078 \times 10^{-7}$
$A_8 = 0.29760 \times 10^{-8}$  $A_{10} = 0.28852 \times 10^{-10}$
$A_{12} = -0.82387 \times 10^{-13}$ $r_{19}$: $A_4 = 0.20193 \times 10^{-4}$  $A_6 = 0.76861 \times 10^{-7}$
$A_8 = -0.35400 \times 10^{-9}$  $A_{10} = 0.52644 \times 10^{-11}$
$A_{12} = -0.12983 \times 10^{-13}$

TABLE 6

[Embodiment 6]

$f = 37.0\sim57.0\sim77.0$  $F_{No.} = 4.1\sim4.9\sim5.1$

| | Radius of curvature | Axial distance | Refractive index (Nd) | Abbe number ($v_d$) |
|---|---|---|---|---|
| $r_1$ | 53.412 | | | |
| | | $d_1$ 1.500 | $N_1$ 1.84666 | $v_1$ 23.83 |
| $r_2$ | 30.376 | | | |
| | | $d_2$ 4.900 | $N_2$ 1.58913 | $v_2$ 61.11 |
| $r_3$ | 216.947 | | | |
| | | $d_3$ 0.150 | | |
| $r_4$ | 21.237 | | | |
| | | $d_4$ 4.100 | $N_3$ 1.51680 | $v_3$ 64.20 |
| $r_5$ | 46.262 | | | |
| | | $d_5$ 1.500~11.150~19.200 | | |
| $r_6$ | −62.126 | | | |
| | | $d_6$ 1.100 | $N_4$ 1.69680 | $v_4$ 56.47 |
| $r_7$ | 12.840 | | | |
| | | $d_7$ 0.728 | | |
| $r_8$ | 13.385 | | | |
| | | $d_8$ 1.600 | $N_5$ 1.84666 | $v_5$ 23.83 |
| $r_9$ | 23.315 | | | |
| | | $d_9$ 2.000 | | |
| $r_{10}$ | ∞ | | | |
| | | $d_{10}$ 3.667~1.871~1.000 | | |
| $r_{11}$ | 64.469 | | | |
| | | $d_{11}$ 1.000 | $N_6$ 1.61272 | $v_6$ 58.52 |
| $r_{12}$ | −50.288 | | | |
| | | $d_{12}$ 0.150 | | |
| $r_{13}$ | *18.186 | | | |
| | | $d_{13}$ 2.000 | $N_7$ 1.49140 | $v_7$ 57.82 |
| $r_{14}$ | −57.739 | | | |
| | | $d_{14}$ 0.944 | | |
| $r_{15}$ | −44.599 | | | |
| | | $d_{15}$ 1.566 | $N_8$ 1.84666 | $v_8$ 23.83 |
| $r_{16}$ | 27.064 | | | |
| | | $d_{16}$ 2.860 | | |
| $r_{17}$ | 81.547 | | | |
| | | $d_{17}$ 3.200 | $N_9$ 1.66998 | $v_9$ 39.23 |
| $r_{18}$ | −20.288 | | | |
| | | $d_{18}$ 17.969~9.226~2.528 | | |
| $r_{19}$ | *−16.747 | | | |
| | | $d_{19}$ 1.500 | $N_{10}$ 1.49140 | $v_{10}$ 57.82 |
| $r_{20}$ | −17.143 | | | |
| | | $d_{20}$ 0.200 | | |
| $r_{21}$ | −17.162 | | | |
| | | $d_{21}$ 1.500 | $N_{11}$ 1.69680 | $v_{11}$ 56.47 |
| $r_{22}$ | −84.860 | | | |

$\Sigma d = 54.133\sim53.244\sim53.726$

Aspheric coefficients $r_{13}$: $A_4 = -0.31815 \times 10^{-4}$  $A_6 = -0.21422 \times 10^{-6}$
$A_8 = 0.41218 \times 10^{-8}$  $A_{10} = 0.53232 \times 10^{-10}$
$A_{12} = 0.14891 \times 10^{-11}$ $r_{19}$: $A_4 = 0.38538 \times 10^{-4}$  $A_6 = -0.35379 \times 10^{-6}$
$A_8 = 0.67620 \times 10^{-8}$  $A_{10} = -0.48971 \times 10^{-10}$
$A_{12} = 0.12423 \times 10^{-12}$

TABLE 7

[Embodiment 7]

f = 36.0~60.0~101.5    $F_{No.}$ = 4.1~5.6~5.8

| Radius of curvature | | Axial distance | Refractive index (Nd) | Abbe number (νd) |
|---|---|---|---|---|
| $r_1$ | 48.355 | | | |
| | | $d_1$ 1.800 | $N_1$ 1.84666 | $ν_1$ 23.83 |
| $r_2$ | 29.863 | | | |
| | | $d_2$ 3.300 | $N_2$ 1.58913 | $ν_2$ 61.11 |
| $r_3$ | 135.906 | | | |
| | | $d_3$ 0.100 | | |
| $r_4$ | 23.886 | | | |
| | | $d_4$ 2.500 | $N_3$ 1.67000 | $ν_3$ 57.07 |
| $r_5$ | 39.891 | | | |
| | | $d_5$ 0.800~9.300~20.800 | | |
| $r_6$ | 102.425 | | | |
| | | $d_6$ 1.200 | $N_4$ 1.80500 | $ν_4$ 40.97 |
| $r_7$ | 12.304 | | | |
| | | $d_7$ 1.800 | | |
| $r_8$ | 83.840 | | | |
| | | $d_8$ 1.150 | $N_5$ 1.77551 | $ν_5$ 37.90 |
| $r_9$ | 20.192 | | | |
| | | $d_9$ 0.300 | | |
| $r_{10}$ | 15.082 | | | |
| | | $d_{10}$ 2.500 | $N_6$ 1.75000 | $ν_6$ 25.14 |
| $r_{11}$ | −378.653 | | | |
| | | $d_{11}$ 1.000 | | |
| $r_{12}$ | −19.103 | | | |
| | | $d_{12}$ 1.150 | $N_7$ 1.72000 | $ν_7$ 50.31 |
| $r_{13}$ | −33.133 | | | |
| | | $d_{13}$ 12.423~6.140~1.000 | | |
| $r_{14}$ | ∞ | | | |
| | | $d_{14}$ 1.300 | | |
| $r_{15}$ | 18.193 | | | |
| | | $d_{15}$ 3.000 | $N_8$ 1.67000 | $ν_8$ 57.07 |
| $r_{16}$ | −40.565 | | | |
| | | $d_{16}$ 0.150 | | |
| $r_{17}$ | 18.778 | | | |
| | | $d_{17}$ 4.500 | $N_9$ 1.51742 | $ν_9$ 52.15 |
| $r_{18}$ | −14.458 | | | |
| | | $d_{18}$ 1.500 | $N_{10}$ 1.80750 | $ν_{10}$ 35.43 |
| $r_{19}$ | 14.103 | | | |
| | | $d_{19}$ 1.860 | | |
| $r_{20}$ | 30.147 | | | |
| | | $d_{20}$ 3.200 | $N_{11}$ 1.51823 | $ν_{11}$ 58.96 |
| $r_{21}$ | −26.653 | | | |
| | | $d_{21}$ 10.605~8.097~1.000 | | |
| $r_{22}$ | *−37.182 | | | |
| | | $d_{22}$ 2.000 | $N_{12}$ 1.58340 | $ν_{12}$ 30.23 |
| $r_{23}$ | −17.577 | | | |
| | | $d_{23}$ 1.600 | | |
| $r_{24}$ | −14.126 | | | |
| | | $d_{24}$ 1.500 | $N_{13}$ 1.69680 | $ν_{13}$ 56.47 |
| $r_{25}$ | −186.779 | | | |

$Σd = 61.239~60.947~60.21$

Aspheric coefficients $r_{22}$:  $A_4 = 0.15726 × 10^{-4}$
$A_6 = -0.51663 × 10^{-6}$
$A_8 = 0.10205 × 10^{-7}$
$A_{10} = -0.80947 × 10^{-10}$
$A_{12} = 0.29771 × 10^{-12}$

TABLE 8

[Embodiment 8]

f = 36.0~60.0~101.5    $F_{No.}$ = 4.1~5.6~5.8

| Radius of curvature | | Axial distance | Refractive index (Nd) | Abbe number (νd) |
|---|---|---|---|---|
| $r_1$ | 43.495 | | | |
| | | $d_1$ 1.800 | $N_1$ 1.84666 | $ν_1$ 23.83 |
| $r_2$ | 28.384 | | | |
| | | $d_2$ 3.300 | $N_2$ 1.58913 | $ν_2$ 61.11 |
| $r_3$ | 101.589 | | | |
| | | $d_3$ 0.100 | | |
| $r_4$ | 22.876 | | | |
| | | $d_4$ 2.500 | $N_3$ 1.67000 | $ν_3$ 57.07 |
| $r_5$ | 36.740 | | | |
| | | $d_5$ 0.800~8.800~20.800 | | |
| $r_6$ | 111.195 | | | |
| | | $d_6$ 1.200 | $N_4$ 1.80500 | $ν_4$ 40.97 |
| $r_7$ | 12.965 | | | |
| | | $d_7$ 1.800 | | |
| $r_8$ | 62.823 | | | |
| | | $d_8$ 1.150 | $N_5$ 1.77551 | $ν_5$ 37.90 |
| $r_9$ | 20.131 | | | |
| | | $d_9$ 0.300 | | |
| $r_{10}$ | 15.406 | | | |
| | | $d_{10}$ 2.500 | $N_6$ 1.75000 | $ν_6$ 25.14 |
| $r_{11}$ | 949.460 | | | |
| | | $d_{11}$ 1.000 | | |
| $r_{12}$ | −20.327 | | | |
| | | $d_{12}$ 1.150 | $N_7$ 1.72000 | $ν_7$ 50.31 |
| $r_{13}$ | −42.872 | | | |
| | | $d_{13}$ 11.773~5.501~1.000 | | |
| $r_{14}$ | ∞ | | | |
| | | $d_{14}$ 1.300 | | |
| $r_{15}$ | 18.607 | | | |
| | | $d_{15}$ 3.000 | $N_8$ 1.67000 | $ν_8$ 57.07 |
| $r_{16}$ | −37.182 | | | |
| | | $d_{16}$ 0.150 | | |
| $r_{17}$ | 17.148 | | | |
| | | $d_{17}$ 4.500 | $N_9$ 1.51742 | $ν_9$ 52.15 |
| $r_{18}$ | −14.534 | | | |
| | | $d_{18}$ 1.500 | $N_{10}$ 1.80750 | $ν_{10}$ 35.43 |
| $r_{19}$ | 14.442 | | | |
| | | $d_{19}$ 2.018 | | |
| $r_{20}$ | 32.264 | | | |
| | | $d_{20}$ 3.200 | $N_{11}$ 1.51823 | $ν_{11}$ 58.96 |
| $r_{21}$ | −27.905 | | | |
| | | $d_{21}$ 9.475~7.849~1.000 | | |
| $r_{22}$ | −40.130 | | | |
| | | $d_{22}$ 2.000 | $N_{12}$ 1.58340 | $ν_{12}$ 30.23 |
| $r_{23}$ | −18.542 | | | |
| | | $d_{23}$ 1.200 | | |
| $r_{24}$ | −14.445 | | | |
| | | $d_{24}$ 1.500 | $N_{13}$ 1.69680 | $ν_{13}$ 56.47 |
| $r_{25}$ | −520.075 | | | |

$Σd = 59.216~59.319~59.968$

TABLE 9

[Embodiment 9]

f = 36.0~70.0~101.5    $F_{No.}$ = 4.1~5.5~8.2

| Radius of curvature | | Axial distance | Refractive index (Nd) | Abbe number (νd) |
|---|---|---|---|---|
| $r_1$ | 48.416 | | | |
| | | $d_1$ 1.500 | $N_1$ 1.84666 | $ν_1$ 23.83 |
| $r_2$ | 29.673 | | | |
| | | $d_2$ 3.300 | $N_2$ 1.58913 | $ν_2$ 61.11 |
| $r_3$ | 138.163 | | | |
| | | $d_3$ 0.100 | | |
| $r_4$ | 23.855 | | | |
| | | $d_4$ 2.300 | $N_3$ 1.67000 | $ν_3$ 57.07 |
| $r_5$ | 39.990 | | | |
| | | $d_5$ 0.800~12.183~20.727 | | |
| $r_6$ | 103.592 | | | |
| | | $d_6$ 1.100 | $N_4$ 1.80500 | $ν_4$ 40.97 |
| $r_7$ | 12.325 | | | |
| | | $d_7$ 1.800 | | |
| $r_8$ | 84.224 | | | |
| | | $d_8$ 1.000 | $N_5$ 1.77551 | $ν_5$ 37.90 |
| $r_9$ | 20.682 | | | |
| | | $d_9$ 0.300 | | |
| $r_{10}$ | 15.086 | | | |
| | | $d_{10}$ 2.500 | $N_6$ 1.75000 | $ν_6$ 25.14 |
| $r_{11}$ | −322.372 | | | |
| | | $d_{11}$ 0.900 | | |
| $r_{12}$ | −18.876 | | | |
| | | $d_{12}$ 1.000 | $N_7$ 1.72000 | $ν_7$ 50.31 |
| $r_{13}$ | −32.280 | | | |
| | | $d_{13}$ 12.142~4.502~1.200 | | |
| $r_{14}$ | ∞ | | | |
| | | $d_{14}$ 1.300 | | |

TABLE 9-continued

[Embodiment 9]

| | Radius of curvature | Axial distance | Refractive index (Nd) | Abbe number (νd) |
|---|---|---|---|---|
| $r_{15}$ | 18.226 | | | |
| | | $d_{15}$ 3.000 | $N_8$ 1.67000 | $\nu_8$ 57.07 |
| $r_{16}$ | −39.797 | | | |
| | | $d_{16}$ 0.150 | | |
| $r_{17}$ | 18.747 | | | |
| | | $d_{17}$ 4.500 | $N_9$ 1.51742 | $\nu_9$ 52.15 |
| $r_{18}$ | −14.230 | | | |
| | | $d_{18}$ 1.500 | $N_{10}$ 1.80750 | $\nu_{10}$ 35.43 |
| $r_{19}$ | 14.221 | | | |
| | | $d_{19}$ 1.862 | | |
| $r_{20}$ | 30.498 | | | |
| | | $d_{20}$ 3.200 | $N_{11}$ 1.51823 | $\nu_{11}$ 58.96 |
| $r_{21}$ | −26.041 | | | |
| | | $d_{21}$ 11.000~7.256~2.015 | | |
| $r_{22}$ | *−35.751 | | | |
| | | $d_{22}$ 3.000 | $N_{12}$ 1.58340 | $\nu_{12}$ 30.23 |
| $r_{23}$ | −18.409 | | | |
| | | $d_{23}$ 1.700 | | |
| $r_{24}$ | −13.563 | | | |
| | | $d_{24}$ 1.500 | $N_{13}$ 1.69680 | $\nu_{13}$ 56.47 |
| $r_{25}$ | −279.601 | | | |

$\Sigma d = 61.454 \sim 61.455 \sim 61.454$

Aspheric coefficients $r_{22}$: $A_4 = 0.26314 \times 10^{-4}$
$A_6 = -0.64273 \times 10^{-6}$
$A_8 = 0.11749 \times 10^{-7}$
$A_{10} = -0.81015 \times 10^{-10}$
$A_{12} = 0.27404 \times 10^{-12}$

TABLE 10

[Embodiment 10]

$f = 36.0 \sim 70.0 \sim 101.5$  $F_{No.} = 4.1 \sim 5.5 \sim 8.2$

| | Radius of curvature | Axial distance | Refractive index (Nd) | Abbe number (νd) |
|---|---|---|---|---|
| $r_1$ | 46.112 | | | |
| | | $d_1$ 1.500 | $N_1$ 1.84666 | $\nu_1$ 23.83 |
| $r_2$ | 29.417 | | | |
| | | $d_2$ 3.300 | $N_2$ 1.60000 | $\nu_2$ 64.38 |
| $r_3$ | 106.101 | | | |
| | | $d_3$ 0.100 | | |
| $r_4$ | 23.508 | | | |
| | | $d_4$ 2.300 | $N_3$ 1.67000 | $\nu_3$ 57.07 |
| $r_5$ | 39.449 | | | |
| | | $d_5$ 0.800~12.439~21.402 | | |
| $r_6$ | −346.657 | | | |
| | | $d_6$ 1.100 | $N_4$ 1.81100 | $\nu_4$ 44.86 |
| $r_7$ | 11.709 | | | |
| | | $d_7$ 1.800 | | |
| $r_8$ | 50.422 | | | |
| | | $d_8$ 1.000 | $N_5$ 1.78100 | $\nu_5$ 44.55 |
| $r_9$ | 22.973 | | | |
| | | $d_9$ 0.300 | | |
| $r_{10}$ | 14.659 | | | |
| | | $d_{10}$ 2.500 | $N_6$ 1.75000 | $\nu_6$ 25.14 |
| $r_{11}$ | 62.473 | | | |
| | | $d_{11}$ 13.154~5.288~2.100 | | |
| $r_{12}$ | ∞ | | | |
| | | $d_{12}$ 1.300 | | |
| $r_{13}$ | 17.311 | | | |
| | | $d_{13}$ 3.000 | $N_7$ 1.67000 | $\nu_7$ 57.07 |
| $r_{14}$ | −44.212 | | | |
| | | $d_{14}$ 0.150 | | |
| $r_{15}$ | 18.713 | | | |
| | | $d_{15}$ 4.500 | $N_8$ 1.51742 | $\nu_8$ 52.15 |
| $r_{16}$ | −13.904 | | | |
| | | $d_{16}$ 1.500 | $N_9$ 1.80750 | $\nu_9$ 35.43 |
| $r_{17}$ | 13.724 | | | |
| | | $d_{17}$ 1.862 | | |
| $r_{18}$ | 35.408 | | | |
| | | $d_{18}$ 3.200 | $N_{10}$ 1.51823 | $\nu_{10}$ 58.96 |
| $r_{19}$ | −22.309 | | | |
| | | $d_{19}$ 11.000~7.227~1.452 | | |
| $r_{20}$ | *−36.665 | | | |
| | | $d_{20}$ 3.000 | $N_{11}$ 1.58340 | $\nu_{11}$ 30.23 |
| $r_{21}$ | −19.075 | | | |

TABLE 10-continued

[Embodiment 10]

| | | | | |
|---|---|---|---|---|
| | | $d_{21}$ 1.700 | | |
| $r_{22}$ | −13.269 | | | |
| | | $d_{22}$ 1.500 | $N_{12}$ 1.69680 | $\nu_{12}$ 56.47 |
| $r_{23}$ | −100.255 | | | |

$\Sigma d = 60.566 \sim 60.566 \sim 60.566$

Aspheric coefficients $r_{20}$: $A_4 = 0.36167 \times 10^{-4}$
$A_6 = -0.51163 \times 10^{-6}$
$A_8 = 0.13985 \times 10^{-7}$
$A_{10} = -0.14075 \times 10^{-9}$
$A_{12} = 0.60270 \times 10^{-12}$

TABLE 11

[Embodiment 11]

$f = 36.0 \sim 70.0 \sim 101.5$  $F_{No.} = 4.1 \sim 5.5 \sim 8.2$

| | Radius of curvature | Axial distance | Refractive index (Nd) | Abbe number (νd) |
|---|---|---|---|---|
| $r_1$ | 47.820 | | | |
| | | $d_1$ 1.500 | $N_1$ 1.84666 | $\nu_1$ 23.83 |
| $r_2$ | 29.799 | | | |
| | | $d_2$ 3.300 | $N_2$ 1.58913 | $\nu_2$ 61.11 |
| $r_3$ | 134.542 | | | |
| | | $d_3$ 0.100 | | |
| $r_4$ | 24.686 | | | |
| | | $d_4$ 2.300 | $N_3$ 1.67790 | $\nu_3$ 55.38 |
| $r_5$ | 39.388 | | | |
| | | $d_5$ 0.800~13.433~22.691 | | |
| $r_6$ | 100.891 | | | |
| | | $d_6$ 1.100 | $N_4$ 1.80700 | $\nu_4$ 39.79 |
| $r_7$ | 12.533 | | | |
| | | $d_7$ 1.802 | | |
| $r_8$ | 83.108 | | | |
| | | $d_8$ 1.000 | $N_5$ 1.77551 | $\nu_5$ 37.90 |
| $r_9$ | 21.127 | | | |
| | | $d_9$ 0.300 | | |
| $r_{10}$ | 15.226 | | | |
| | | $d_{10}$ 2.500 | $N_6$ 1.75000 | $\nu_6$ 25.14 |
| $r_{11}$ | −346.422 | | | |
| | | $d_{11}$ 0.900 | | |
| $r_{12}$ | −19.285 | | | |
| | | $d_{12}$ 1.000 | $N_7$ 1.72000 | $\nu_7$ 50.31 |
| $r_{13}$ | −31.434 | | | |
| | | $d_{13}$ 11.831~4.493~1.200 | | |
| $r_{14}$ | ∞ | | | |
| | | $d_{14}$ 1.300 | | |
| $r_{15}$ | 17.618 | | | |
| | | $d_{15}$ 3.000 | $N_8$ 1.67000 | $\nu_8$ 57.07 |
| $r_{16}$ | −41.864 | | | |
| | | $d_{16}$ 0.150 | | |
| $r_{17}$ | 19.067 | | | |
| | | $d_{17}$ 4.500 | $N_9$ 1.51742 | $\nu_9$ 52.15 |
| $r_{18}$ | −14.056 | | | |
| | | $d_{18}$ 1.500 | $N_{10}$ 1.80750 | $\nu_{10}$ 35.43 |
| $r_{19}$ | 13.910 | | | |
| | | $d_{19}$ 2.100 | | |
| $r_{20}$ | 31.068 | | | |
| | | $d_{20}$ 3.200 | $N_{11}$ 1.51823 | $\nu_{11}$ 58.96 |
| $r_{21}$ | −27.254 | | | |
| | | $d_{21}$ 12.000~6.704~0.740 | | |
| $r_{22}$ | *−36.808 | | | |
| | | $d_{22}$ 3.400 | $N_{12}$ 1.58340 | $\nu_{12}$ 30.23 |
| $r_{23}$ | −17.563 | | | |
| | | $d_{23}$ 1.700 | | |
| $r_{24}$ | −13.571 | | | |
| | | $d_{24}$ 1.500 | $N_{13}$ 1.69680 | $\nu_{13}$ 56.47 |
| $r_{25}$ | −256.004 | | | |

$\Sigma d = 62.783 \sim 62.783 \sim 62.784$

Aspheric coefficients $r_{22}$: $A_4 = 0.21747 \times 10^{-4}$
$A_6 = -0.57360 \times 10^{-6}$
$A_8 = 0.12396 \times 10^{-7}$
$A_{10} = -0.10245 \times 10^{-9}$

TABLE 11-continued

[Embodiment 11]

| | |
|---|---|
| $A_{12} =$ | $0.37238 \times 10^{-12}$ |

TABLE 12

[Embodiment 12]

$f = 36.0 \sim 70.0 \sim 101.5$  $F_{No.} = 4.1 \sim 5.5 \sim 8.2$

| Radius of curvature | Axial distance | Refractive index (Nd) | Abbe number ($\nu d$) |
|---|---|---|---|
| $r_1$ 46.802 | | | |
| | $d_1$ 1.500 | $N_1$ 1.84666 | $\nu_1$ 23.83 |
| $r_2$ 29.145 | | | |
| | $d_2$ 3.300 | $N_2$ 1.58913 | $\nu_2$ 61.11 |
| $r_3$ 152.617 | | | |
| | $d_3$ 0.100 | | |
| $r_4$ 21.773 | | | |
| | $d_4$ 2.300 | $N_3$ 1.58913 | $\nu_3$ 61.11 |
| $r_5$ 41.426 | | | |
| | $d_5$ 1.000~10.785~18.872 | | |
| $r_6$ 146.313 | | | |
| | $d_6$ 1.100 | $N_4$ 1.80500 | $\nu_4$ 40.97 |
| $r_7$ 12.458 | | | |
| | $d_7$ 1.800 | | |
| $r_8$ 90.569 | | | |
| | $d_8$ 1.000 | $N_5$ 1.77551 | $\nu_5$ 37.90 |
| $r_9$ 20.322 | | | |
| | $d_9$ 0.300 | | |
| $r_{10}$ 15.221 | | | |
| | $d_{10}$ 2.500 | $N_6$ 1.75000 | $\nu_6$ 25.14 |
| $r_{11}$ −447.535 | | | |
| | $d_{11}$ 0.900 | | |
| $r_{12}$ −18.205 | | | |
| | $d_{12}$ 1.000 | $N_7$ 1.69680 | $\nu_7$ 56.47 |
| $r_{13}$ −33.872 | | | |
| | $d_{13}$ 9.200~6.514~0.809 | | |
| $r_{14}$ ∞ | | | |
| | $d_{14}$ 1.300 | | |
| $r_{15}$ 17.889 | | | |
| | $d_{15}$ 3.000 | $N_8$ 1.65100 | $\nu_8$ 55.78 |
| $r_{16}$ −35.038 | | | |
| | $d_{16}$ 0.150 | | |
| $r_{17}$ 17.266 | | | |
| | $d_{17}$ 4.500 | $N_9$ 1.51823 | $\nu_9$ 58.96 |
| $r_{18}$ −13.610 | | | |
| | $d_{18}$ 1.500 | $N_{10}$ 1.83400 | $\nu_{10}$ 37.05 |
| $r_{19}$ 14.306 | | | |
| | $d_{19}$ 1.862 | | |
| $r_{20}$ 28.995 | | | |
| | $d_{20}$ 3.200 | $N_{11}$ 1.51742 | $\nu_{11}$ 52.15 |
| $r_{21}$ −21.789 | | | |
| | $d_{21}$ 10.500~7.814~2.109 | | |
| $r_{22}$ *−33.916 | | | |
| | $d_{22}$ 3.000 | $N_{12}$ 1.58340 | $\nu_{12}$ 30.23 |
| $r_{23}$ −20.290 | | | |
| | $d_{23}$ 1.800 | | |
| $r_{24}$ −12.795 | | | |
| | $d_{24}$ 1.500 | $N_{13}$ 1.69680 | $\nu_{13}$ 56.47 |
| $r_{25}$ −153.030 | | | |

$\Sigma d = 59.793 \sim 59.793 \sim 59.793$

Aspheric coefficients $r_{22}$: $A_4 = 0.35728 \times 10^{-4}$
$A_6 = -0.50201 \times 10^{-6}$
$A_8 = 0.14390 \times 10^{-7}$
$A_{10} = -0.1522 \times 10^{-9}$
$A_{12} = 0.76396 \times 10^{-12}$

TABLE 13

[Embodiment 13]

$f = 37.0 \sim 60.0 \sim 101.5$  $F_{No.} = 4.1 \sim 5.6 \sim 5.8$

| Radius of curvature | Axial distance | Refractive index (Nd) | Abbe number ($\nu d$) |
|---|---|---|---|
| $r_1$ 50.074 | | | |
| | $d_1$ 1.800 | $N_1$ 1.84666 | $\nu_1$ 23.83 |
| $r_2$ 31.247 | | | |
| | $d_2$ 3.300 | $N_2$ 1.58913 | $\nu_2$ 61.11 |
| $r_3$ 144.115 | | | |
| | $d_3$ 0.100 | | |
| $r_4$ 24.077 | | | |
| | $d_4$ 2.500 | $N_3$ 1.67000 | $\nu_3$ 57.07 |
| $r_5$ 40.426 | | | |
| | $d_5$ 0.800~9.300~20.800 | | |
| $r_6$ 102.804 | | | |
| | $d_6$ 1.200 | $N_4$ 1.80500 | $\nu_4$ 40.97 |
| $r_7$ 12.075 | | | |
| | $d_7$ 1.800 | | |
| $r_8$ 94.480 | | | |
| | $d_8$ 1.150 | $N_5$ 1.77551 | $\nu_5$ 37.90 |
| $r_9$ 20.342 | | | |
| | $d_9$ 0.300 | | |
| $r_{10}$ 15.009 | | | |
| | $d_{10}$ 2.500 | $N_6$ 1.75000 | $\nu_6$ 25.14 |
| $r_{11}$ −339.474 | | | |
| | $d_{11}$ 1.000 | | |
| $r_{12}$ −19.056 | | | |
| | $d_{12}$ 1.150 | $N_7$ 1.72000 | $\nu_7$ 50.31 |
| $r_{13}$ −32.393 | | | |
| | $d_{13}$ 12.673~6.173~1.000 | | |
| $r_{14}$ ∞ | | | |
| | $d_{14}$ 1.300 | | |
| $r_{15}$ 18.470 | | | |
| | $d_{15}$ 3.000 | $N_8$ 1.67000 | $\nu_8$ 57.07 |
| $r_{16}$ −41.270 | | | |
| | $d_{16}$ 0.150 | | |
| $r_{17}$ 19.744 | | | |
| | $d_{17}$ 4.500 | $N_9$ 1.51742 | $\nu_9$ 52.15 |
| $r_{18}$ −14.273 | | | |
| | $d_{18}$ 1.500 | $N_{10}$ 1.80750 | $\nu_{10}$ 35.43 |
| $r_{19}$ 14.756 | | | |
| | $d_{19}$ 1.848 | | |
| $r_{20}$ 30.725 | | | |
| | $d_{20}$ 3.200 | $N_{11}$ 1.51823 | $\nu_{11}$ 58.96 |
| $r_{21}$ −24.162 | | | |
| | $d_{21}$ 9.723~7.678~1.000 | | |
| $r_{22}$ *−37.355 | | | |
| | $d_{22}$ 2.000 | $N_{12}$ 1.58340 | $\nu_{12}$ 30.23 |
| $r_{23}$ −17.232 | | | |
| | $d_{23}$ 1.600 | | |
| $r_{24}$ −14.077 | | | |
| | $d_{24}$ 1.500 | $N_{13}$ 1.69680 | $\nu_{13}$ 56.47 |
| $r_{25}$ −155.112 | | | |
| | $d_{25}$ 1.000~9.545~21.395 | | |
| $r_{26}$ −953.543 | | | |
| | $d_{26}$ 2.000 | $N_{14}$ 1.51680 | $\nu_{14}$ 64.20 |
| $r_{27}$ 1129.140 | | | |

$\Sigma d = 63.593 \sim 72.093 \sim 83.593$

Aspheric coefficients $r_{22}$: $A_4 = 0.13715 \times 10^{-4}$
$A_6 = -0.56540 \times 10^{-6}$
$A_8 = 0.12241 \times 10^{-7}$
$A_{10} = -0.11289 \times 10^{-9}$
$A_{12} = 0.46513 \times 10^{-12}$

What is claimed is:

1. A compact zoom lens system comprising from object side to image side:
    a first lens unit of a positive refractive power;
    a second lens unit of a negative refractive power with a first variable air space formed between the first and second lens units;
    a third lens unit of a positive refractive power; and
    a fourth lens unit of a negative refractive power with a second variable air space formed between the third lens unit and fourth lens unit;
    wherein the back focal length of the whole lens system for the shortest focal length is less than half of the diagonal length of the image plane;
    wherein the first lens unit, the fourth lens unit and at least one of the second and third lens units are shiftable from the image side to the object side so that the first variable air space increases and the second variable air space decreases in the zooming operation from the shortest focal length to the longest focal length; and wherein the third lens unit includes at least an aspherical surface and fulfills the following condition:

$$\frac{|X| - |X_0|}{C_0(N' - N)} < 0$$

wherein, X represents the distance along the optical axis measured from a intersection of the basic (paraxial) spherical surface and the optical axis and is expressed as the following equation:

$$X = X_0 + \Sigma A_{2i} Y^{2i},$$

$X_0$ represents the distance along the optical axis measured from the intersection and is expressed as the following equation : $X_0 = C_0 Y^2 / \{1 + (1 - C_0^2 Y^2)\}$, Y represents the distance from the optical axis, $C_0$ represents the radius of curvature of the basic spherical surface of the aspherical surface, N represents the refractive index of the material existing at the object side of the aspherical surface, and N' represents the refractive index of the material existing at the image side of the aspherical surface.

2. A compact zoom lens system as claimed in claim 1, wherein the zoom lens system fulfills the following condition:

$$0.65 < f_3/f_4 < 1.0$$

wherein, $f_3$ represents the focal length of the third lens unit, and $f_4$ represents the focal length of the fourth lens unit.

3. A compact zoom lens system as claimed in claim 2, wherein the zoom lens system fulfills the following condition:

$$0.08 < Z/f_3 < 1.50$$

wherein, Z represents the zoom ratio of the whole lens system.

4. A compact zoom lens system as claimed in claim 3, wherein the aspherical surface is formed on an object side surface convex to the object side in the third lens unit.

5. A compact zoom lens system as claimed in claim 3, wherein the aspherical surface is formed on a positive lens element in the third lens unit and fulfills the following conditions:

$$n_{3\text{-}p} < 1.5$$

$$\nu_{3\text{-}p} < 60$$

wherein, $n_{3\text{-}p}$ represents the refractive index of the positive lens element of the third positive lens unit, and $\nu_{3\text{-}p}$ represents the Abbe number of the positive lens element of the third positive lens unit.

6. A compact zoom lens system as claimed in claim 1, wherein the second lens unit includes an aperture stop and is fixed on the optical axis of the lens system in the zooming operation.

7. A compact zoom lens system as claimed in claim 1, wherein the fourth lens unit includes an aspherical lens element.

8. A compact zoom lens system as claimed in claim 5, wherein the first lens unit includes a negative lens element having an object side surface convex to the object side and a positive lens element having an image side surface concave to the image side, said positive lens element being arranged at the image side end of the first lens unit.

9. A compact zoom lens system as claimed in claim 5, wherein the second lens unit includes a negative lens element and a positive lens element.

10. A compact zoom lens system as claimed in claim 5, wherein the third lens unit includes at least a triplet type lens consisting of from the object side to the image side a first positive lens element, a second negative lens element and a third positive lens element.

11. A compact zoom lens system as claimed in claim 5, wherein the fourth lens unit includes a negative meniscus lens element at the image side end.

12. A compact zoom lens system comprising, from object side to image side:

a first lens unit of a positive refractive power;

a second lens unit of a negative refractive power with a first variable air space formed between the first and second lens units;

a third lens unit of a positive refractive power with a second variable air space formed between the second and third lens units, and a fourth lens unit of a negative refractive power with a third variable air space formed between the third and fourth lens units;

wherein the back focal length of the whole lens system for the shortest focal length is less than half of the diagonal length of the image plane;

wherein the first lens unit, the fourth lens unit, and at least one of the second and third lens units are shiftable from the image side to the object side so that the first variable air space increases and the second and third variable air spaces decrease in the zooming operation from the shortest focal length to the longest focal length, and wherein the fourth lens unit includes at least an aspherical surface and fulfills the following condition:

$$10 < L_2 \cdot \frac{f_S}{f_L} < 25.5$$

$$2.5 < \left|\frac{\phi_2}{\phi_1}\right| < 6.0$$

$$0.2 < \frac{\beta_{4L}}{\beta_{4S}} \cdot \frac{f_S}{f_L} < 0.60$$

wherein $L_2$ represents the length from the front apex of the lens element of the object side end of the second negative lens unit to a film, $f_S$ represents the focal length of the whole lens system for the shortest focal length, $F_L$ represents the focal length of the whole lens system for the longest focal length, $\phi_1$ represents the refractive power of the first positive lens unit, $\phi_2$ represents the refractive power of the second negative lens unit, and $\beta_{4L}$ and $\beta_{4S}$ respectively represent the lateral magnifications of the fourth lens unit for the longest focal length and for the shortest focal length.

13. A compact zoom lens system as claimed in claim 12, wherein the lens system fulfills the following condition:

$$0.9 < \frac{L_3}{FM} < 4.0$$

wherein, $L_3$ represents the length from the front apex of the lens element of the object side end of the third positive lens unit to a film, and FM represents diagonal length of the image plane.

14. A compact zoom lens system as claimed in claim 13, wherein the lens system fulfills the following conditions:

$$0.14 < \frac{\Delta d_{23}}{f_S} < 2.0$$

$$0.05 < \frac{f_1}{\Delta T_1} \cdot \frac{f_S}{f_L} < 2.0$$

wherein, $\Delta d_{23}$ represents the difference between the air spaces, formed between the second negative lens unit and the third positive lens unit, for the shortest focal length and for the longest focal length, $f_1$ represents the focal length of the first lens unit and $\Delta T_1$ represents the shifting amount of the first positive lens unit in the zooming operation from the shortest focal length to the longest focal length.

15. A compact zoom lens system as claimed in claim 14, wherein the lens system fulfills the following condition:

$$\frac{|X| - |X_0|}{C_0 (N' - N)} > 0$$

wherein, X represents the distance along the optical axis measured from a intersection of the basic (paraxial) spherical surface and the optical axis and is expressed as the following equation:

$$X = X_0 + \sum_i A_{2i} Y^{2i},$$

$X_0$ represents the distance along the optical axis measured from the intersection and is expressed as the following equation : $X_0 = C_0 Y^2 / \{1 + (1 - C_0^2 Y^2)\}$, Y represents the distance from the optical axis, $C_0$ represents the radius of curvature of the basic spherical surface of the aspherical surface, N represents the refractive index of the material existing at the object side of the aspherical surface, and N' represents the refractive index of the material existing at the image side of the aspherical surface.

16. A compact zoom lens system as claimed in claim 15, wherein the second lens unit includes a negative lens element and a positive lens element.

17. A compact zoom lens system as claimed in claim 15, wherein the second lens unit includes a positive lens element and two negative lens elements.

18. A compact zoom lens system as claimed in claim 15, wherein the third lens unit comprises from the object side to the image side a first positive lens element, a second positive lens element, a third negative lens element and a fourth positive lens element.

19. A compact zoom lens system as claimed in claim 15, wherein the fourth lens unit includes a negative meniscus lens element at the image side end.

20. A compact zoom lens system comprising, from object side to image side:
 a first lens unit of a positive refractive power;
 a second lens unit of a negative refractive power with a first variable air space formed between the first and second lens units;
 a third lens unit of a positive refractive power with a second variable air space formed between the second and third lens units and
 a fourth lens unit of a negative refractive power with a third variable air space formed between the third and fourth lens units;
 wherein the back focal length of the whole lens system from the shortest focal length is less than half of the diagonal length of the image plane;
 wherein the first lens unit, the fourth lens unit, and at least one of the second and third lens units are shiftable from the image side to the object side so that the first variable air space increases and the second and third variable air spaces decrease in the zooming operation from the shortest focal length to the longest focal length, and
 wherein the fourth lens unit includes at least an aspherical surface and fulfills the following condition:

$$\frac{X - X_0}{C_0 (N' - N)} > 0$$

wherein X represents the distance along the optical axis measured from an intersection of the basic (paraxial) spherical surface and the optical axis and is expressed as the following equation:

$$X = X_0 + \sum_i A_{2i} Y^{2i},$$

wherein Z represents the zoom ratio of the whole lens system, $f_4$ represents the focal length of the fourth lens unit, $\beta_{4L}$ and $\beta_{4S}$ respectively represent the lateral magnification of the fourth lens unit for the longest focal length and for the shortest focal length, $f_S$ represents the focal length of the hole lens system for the shortest focal length, and $f_{123S}$ represents the compound focal length of the first to third lens units for the shortest focal length, wherein the fourth lens unit comprises, from the object side to the image side, a first positive lens element and a second negative lens element, and the first positive lens element has an aspherical surface and fulfills the following condition:

$$n_{4\text{-}1} < 1.5$$

$$\nu_{4\text{-}1} < 60$$

wherein $n_{4\text{-}1}$ represent the refractive index of the first positive lens element of the fourth negative lens unit, and $\nu_{4\text{-}1}$ represents the Abbe number of the first positive lens element of the fourth negative lens unit, wherein the fourth lens unit includes a negative meniscus lens element at eh image side end.

21. A compact zoom lens system as claimed in claim 20, wherein the second lens unit includes a negative lens element and a positive lens element.

22. A compact zoom lens system as claimed in claim 20, wherein the third lens unit includes at least a triplet type lens consisting of from the object side to the image side a first positive lens element, a second negative lens element and a third positive lens element.

23. A compact zoom lens system comprising, from object side to image side:
- a first lens unit of a positive refractive power;
- a second lens unit of a negative refractive power with a first variable air space formed between the first and second lens units, the second lens unit including an aperture stop and being fixed on the optical axis of the lens system in the zooming operation;
- a third lens unit of a positive refractive power with a second variable air space formed between the second and third lens units, and
- a fourth lens unit of a negative refractive power with a third variable air space formed between the third and fourth lens units;
- wherein the back focal length of the whole lens system for the shortest focal length is less than half of the diagonal length of the image plane;
- wherein the first lens unit, the fourth lens unit, and at least one of the second and third lens units are shiftable from the image side to the object side so that the first variable air space increases and the second and third variable air spaces decrease in the zooming operation from the shortest focal length to the longest focal length, and
- wherein the fourth lens unit includes at least an aspherical surface and fulfills the following condition:

$$\frac{X - X_0}{C_0 (N' - N)} > 0$$

wherein X represents the distance along the optical axis measured from an intersection of the basic (paraxial) spherical surface and the optical axis and is expressed as the following equation:

$$X = X_0 + \sum_i A_{2i} Y^{2i},$$

$X_0$ represents the distance along the optical axis measured from the intersection and is expressed as the following equation:

$$X_0 = C_0 Y^2 / \{1 - (1 - C_0^2 Y^2)\},$$

Y represents the distance from the optical axis, $C_0$ represents the radius of curvature of the basic spherical surface of the aspherical surface, N represents the refractive index of the material existing at the object side of the aspherical surface, and N' represents the refractive index of the material existing at the image side of the aspherical surface.

24. A compact zoom lens system comprising, from object side to image side:
- a first lens unit of a positive refractive power;
- a second lens unit of a negative refractive power with a first variable air space formed between the first and second lens units, the second lens unit including an aperture stop and being fixed on the optical axis of the lens system in the zooming operation;
- a third lens unit which includes an aspherical lens element of a positive refractive power with a second variable air space formed between the second and third lens units, and
- a fourth lens unit of a negative refractive power with a third variable air space formed between the third and fourth lens units;
- wherein the back focal length of the whole lens system for the shortest focal length is less than half of the diagonal length of the image plane;
- wherein the first lens unit, the fourth lens unit, and at least one of the second and third lens units are shiftable from the image side to the object side so that the first variable air space increases and the second and third variable air spaces decrease on the zooming operation from the shortest focal length to the longest focal length, and
- wherein the fourth lens unit includes at least an aspherical surface and fulfills the following condition:

$$\frac{X - X_0}{C_0 (N' - N)} > 0$$

wherein x represents the distance along the optical axis measured from an intersection of the basic (paraxial) spherical surface and the optical axis and is expressed as the following equation:

$$X = X_0 + \sum_i A_{2i} Y^{2i},$$

$X_0$ represents the distance along the optical axis measured from the intersection and is expressed as the following equation:

$$X_0 = C_0 Y^2 / \{1 - C_0^2 Y^2)\},$$

Y represents the distance from the optical axis, $C_0$ represents the radius of curvature of the basic spherical surface of the aspherical surface, N represents the refractive index of the material existing at the object side of the aspherical surface, and N' represents the refractive index of the material existing at the image side of the aspherical surface.

25. A compact zoom lens system as claimed in claim 24, wherein the lens system fulfills the following conditions:

$$0.05 < Z/\{f_4\} < 0.15$$

$$1.35 < \beta_{4L}/\beta_{4S} < 2.0$$

wherein, Z represents the zoom ratio of the whole lens system, $f_4$ represents the focal length of the fourth lens unit, $\beta_{4L}$ and $\beta_{4S}$ respectively represent the lateral magnification of the fourth lens unit for the longest focal length and for the shortest focal length.

26. A compact zoom lens system as claimed in claim 25, wherein the lens system fulfills the following conditions:

$$1.15 < f_S/\{f_4\} < 2.0$$

$$0.9 < f_{123S}/\{f_4\} < 1.8$$

wherein $f_S$ represents the focal length of the whole lens system for the shortest focal length, and $f_{123S}$ represents the compound focal length of the first to third lens units for the shortest focal length.

27. A compact zoom lens system as claimed in claim 26, wherein the fourth lens unit comprises from the object side to the image side a first positive lens element and a second negative lens element, and the first positive lens element has an aspherical surface and fulfills the following conditions:

$$n_{4-1} < 1.5$$

$$\nu_{4-1} < 60$$

wherein, $n_{4-1}$ represents the refractive index of the first positive lens element of the fourth negative lens unit, and $\nu_{4-1}$ represents the Abbe number of the first positive lens element of the fourth negative lens unit.

28. A compact zoom lens system comprising, from object side to image side:
- a first lens unit of a positive refractive power, including a negative lens element having an object side surface convex to the object side and a positive lens element having an image side surface concave to the image side, said positive lens element being arranged at the image side end of the first lens unit;
- a second lens unit of a negative refractive power with a first variable air space formed between the first and second lens units;
- a third lens unit of a positive refractive power with a second variable air space formed between the second and third lens units, and
- a fourth lens unit of a negative refractive power with a third variable air space formed between the third and fourth lens units;
- wherein the back focal length of the whole lens system for the shortest focal length is less than half of the diagonal length of the image plane;
- wherein the first lens unit, the fourth lens unit, and at least one of the second and third lens units are shiftable from the image side to the object side so that the first variable air space increases and the second and third variable air spaces decrease in the zooming operation from the shortest focal length to the longest focal length, and
- wherein the fourth lens unit includes at least an aspherical surface and fulfills the following condition:

$$\frac{X - X_0}{C_0 (N' - N)} > 0$$

wherein X represents the distance along the optical axis measured from an intersection of the basic (paraxial) spherical surface and the optical axis and is expressed as the following equation:

$$X = X_0 + \sum_i A_{2i} Y^{2i},$$

$X_0$ represents the distance along the optical axis measured from the intersection and is expressed as the following equation:

$$X_0 = C_0 Y^2 / \{1 + (a \cdot C_0^2 Y^2)\},$$

Y represents the distance from the optical axis, $C_0$ represents the radius of curvature of the basic spherical surface of the aspherical surface, N represents the refractive index of the material existing at the object side of the aspherical surface, and N' represents the refractive index of the material existing at the image side of the aspherical surface, wherein the lens system fulfills the following condition:

$$0.05 < Z/\{f_4\} < 0.15$$

$$1.35 < \beta_{4L}/\beta_{4S} < 2.0$$

$$1.15 < f_S/\{f_4\} < 2.0$$

$$0.9 < f_{123S}/\{f_4\} < 1.8$$

wherein Z represents the zoom ratio of the whole lens system, $f_4$ represents the focal length of the fourth lens unit, $\beta_{4L}$ and $\beta_{4S}$ respectively represent the lateral magnification of the fourth lens unit for the longest focal length and for the shortest focal length, $f_S$ represents the focal length of the whole lens system for the shortest focal length, and $f_{123S}$ represents the compound focal length of the first to third lens units for the shortest focal length, wherein the fourth lens unit comprises, from the object side to the image side, a first positive lens element and a second negative lens element, and the first positive lens element has an aspherical surface and fulfills the following conditions:

$$n_{4-1} < 1.5$$

$$\nu_{4-1} < 60$$

wherein $n_{4-1}$ represents the refractive index of the first positive lens element of the fourth negative lens unit, and $\nu_{4-1}$ represents the Abbe number of the first positive lens element of the fourth negative lens unit.

* * * * *

UNITED STATES PATENT AND TRADEMARK OFFICE
CERTIFICATE OF CORRECTION

PATENT NO. : 5,086,356

DATED : February 4, 1992

INVENTOR(S) : Ayako Kojima et al

It is certified that error appears in the above-identified patent and that said Letters Patent is hereby corrected as shown below:

Column 26, line 42, Claim 20, insert --

Claim 20, line 42, insert -- $X_0$ represents the distance along the optical axis measured from the intersection and is expressed as the following equation:

$$X_0 = C_0 Y^2 / \{1 + (1 - C_0^2 Y^2)\},$$

Y represents the distance from the optical axis, $C_0$ represents the radius of curvature of the basic spherical surface of the aspherical surface, N represents the refractive index of the material existing at the object

UNITED STATES PATENT AND TRADEMARK OFFICE
CERTIFICATE OF CORRECTION

PATENT NO. : 5,086,356
DATED : February 4, 1992
INVENTOR(S) : Ayako Kojima et al Page 2 of 2

It is certified that error appears in the above-identified patent and that said Letters Patent is hereby corrected as shown below:

side of the aspherical surface and N' represents the refractive index of the material existing at the image side of the aspherical surface, wherein the lens system fulfills the following conditions:

$$0.05 < Z/|f_4| < 0.15$$
$$1.35 < \beta_{4L}/\beta_{4S} < 2.0$$
$$1.15 < f_S/|f_4| < 2.0$$
$$0.9 < f_{123S}/|f_4| < 1.8--.$$

Signed and Sealed this

Twenty-second Day of June, 1993

*Attest:*

MICHAEL K. KIRK

*Attesting Officer*     *Acting Commissioner of Patents and Trademarks*